US011185945B2

(12) United States Patent
Hori et al.

(10) Patent No.: US 11,185,945 B2
(45) Date of Patent: Nov. 30, 2021

(54) METHOD FOR MANUFACTURING LIQUID COOLING JACKET

(71) Applicant: NIPPON LIGHT METAL COMPANY, LTD., Tokyo (JP)

(72) Inventors: Hisashi Hori, Shizuoka (JP); Nobushiro Seo, Shizuoka (JP); Kosuke Yamanaka, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 106 days.

(21) Appl. No.: 16/753,735

(22) PCT Filed: Aug. 16, 2018

(86) PCT No.: PCT/JP2018/030412
§ 371 (c)(1),
(2) Date: Apr. 3, 2020

(87) PCT Pub. No.: WO2019/150620
PCT Pub. Date: Aug. 8, 2019

(65) Prior Publication Data
US 2020/0254556 A1    Aug. 13, 2020

(30) Foreign Application Priority Data
Feb. 1, 2018    (JP) .............................. JP2018-016554

(51) Int. Cl.
*B23K 20/12* (2006.01)
*B23K 103/10* (2006.01)

(52) U.S. Cl.
CPC ...... *B23K 20/1255* (2013.01); *B23K 20/1265* (2013.01); *B23K 20/124* (2013.01);
(Continued)

(58) Field of Classification Search
CPC ............ B23K 20/1255; B23K 20/1265; B23K 2103/10; B23K 20/1225; B23K 20/124;
(Continued)

(56) References Cited

U.S. PATENT DOCUMENTS 6,325,273 B1 * 12/2001 Boon ................. B23K 20/1245
228/112.1
6,421,578 B1 * 7/2002 Adams ................. B23K 20/123
228/112.1
(Continued)

FOREIGN PATENT DOCUMENTS

CA    2884230 A1 *  3/2014  ......... B23K 20/1265
CN    203209851 U    9/2013
(Continued)

OTHER PUBLICATIONS

Office Action for Chinese Patent Application No. 201880076427.6, dated Jun. 1, 2021.
(Continued)

*Primary Examiner* — Kiley S Stoner
(74) *Attorney, Agent, or Firm* — Merchant & Gould P.C.

(57) ABSTRACT

Provided is a method for manufacturing a liquid cooling jacket including a jacket body and a sealing body joined to the jacket body. The method includes steps of: preparing; placing; first primary joining with a rotary tool; and second primary joining with the rotary tool. The rotary tool includes a base end pin and a distal end pin. The distal end pin includes a flat surface and a protrusion protruding from the flat surface. In the first primary joining and the second primary joining, friction stirring is performed in a state where the jacket body and the sealing body are brought in contact with the flat surface of the distal end pin and the base end pin and only the jacket body is brought in contact with a distal end surface of the protrusion.

11 Claims, 26 Drawing Sheets

(52) U.S. Cl.
CPC ........ *B23K 20/128* (2013.01); *B23K 20/1225* (2013.01); *B23K 2103/10* (2018.08)

(58) Field of Classification Search
CPC .............. B23K 20/128; B23K 2101/14; B23K 20/122–128
USPC ............................... 228/112.1–114.5, 2.1–2.3
See application file for complete search history.

(56) References Cited

U.S. PATENT DOCUMENTS

| | | | |
|---|---|---|---|
| 6,669,075 B2 | 12/2003 | Colligan | |
| 2003/0024965 A1* | 2/2003 | Okamura | B23K 20/16 228/112.1 |
| 2006/0086775 A1* | 4/2006 | Trapp | B23K 20/1255 228/112.1 |
| 2008/0251571 A1* | 10/2008 | Burford | B23K 20/1255 228/114.5 |
| 2009/0072007 A1 | 3/2009 | Nagano | |
| 2010/0081005 A1* | 4/2010 | Aoh | B23K 20/1255 428/615 |
| 2010/0282822 A1 | 11/2010 | Nagano | |
| 2011/0180587 A1* | 7/2011 | Trapp | B23K 20/1265 228/2.1 |
| 2012/0153007 A1* | 6/2012 | Sall | B23K 20/1255 228/112.1 |
| 2014/0166731 A1 | 6/2014 | Seo et al. | |
| 2015/0290739 A1 | 10/2015 | Seo et al. | |
| 2018/0214975 A1* | 8/2018 | Werz | B23K 20/1255 |
| 2018/0272479 A1 | 9/2018 | Hori et al. | |
| 2019/0039168 A1* | 2/2019 | Hori | B23K 20/26 |
| 2019/0358740 A1* | 11/2019 | Hori | B23K 20/122 |
| 2021/0053144 A1* | 2/2021 | Hori | B23K 20/1235 |
| 2021/0146472 A1* | 5/2021 | Hori | B23K 20/129 |
| 2021/0213561 A1* | 7/2021 | Hori | B23K 20/1255 |

FOREIGN PATENT DOCUMENTS

| | | |
|---|---|---|
| JP | 2006-212651 A | 8/2006 |
| JP | 2007-160370 A | 6/2007 |
| JP | 4210148 B | 1/2009 |
| JP | 2013-039613 A | 2/2013 |
| JP | 2016-087649 A | 5/2016 |
| JP | 2016-215264 A | 12/2016 |
| WO | 2007/119343 A1 | 10/2007 |

OTHER PUBLICATIONS

International Search Report for No. PCT/JP2018/030412, dated Oct. 2, 2018.

* cited by examiner

METHOD FOR MANUFACTURING LIQUID COOLING JACKET

This application is a National Stage Application of PCT/JP2018/030412, filed Aug. 16, 2018, which claims benefit of priority to Japanese Patent Application No. 2018-016554, filed Feb. 1, 2018, which applications are incorporated herein by reference. To the extent appropriate, a claim of priority is made to each of the above disclosed applications.

TECHNICAL FIELD

The present invention relates to a method for manufacturing a liquid cooling jacket.

BACKGROUND ART

There has been a rotary tool, which includes a shoulder portion and a stirring pin extending downward from the shoulder portion, used for friction stir joining. The rotary tool is also used for manufacturing a liquid cooling jacket which includes a jacket body and a sealing body. The rotary tool is used for friction stir joining in a state where a lower end surface of the shoulder portion presses metal members. Formation of burrs can be suppressed by the shoulder portion being pressed against the metal members to press a plastically fluidized material. However, when a height position of joining is changed, defects are liable to be formed, and the larger a recessed groove is, the more burrs are generated.

Meanwhile, there has been a friction stir joining method with a rotary tool having a stirring pin to join two metal members, which includes a primary joining step to perform friction stir joining in a state where the stirring pin being rotated is inserted into an abutted portion of the metal members and only the stirring pin is brought in contact with the metal members (Patent Literature 1). According to the conventional technology, a spiral groove is formed in an outer peripheral surface of the stirring pin. Friction stir joining is performed in a state where a base end portion is exposed while only the stirring pin is brought in contact with joined members. As a result, formation of defects is suppressed even when a height position of joining is changed, and a load to a friction stirring apparatus is reduced. However, as a plastically fluidized material is not pressed by a shoulder portion, a recessed groove formed in surfaces of the metal members tends to be larger and a joined surface is made coarse. Further, bulged portions (portions, which are bulged as compared to those before joining, of the front surfaces of the metal members) are formed on sides of the recessed groove.

Further, Patent Literature 2 describes a rotary tool having a shoulder portion and a stirring pin extending downward from the shoulder portion. Tapered surfaces are formed on outer peripheral surfaces of the shoulder portion and the stirring pin, respectively. A groove having a spiral shape in planar view is formed in the tapered surface of the shoulder portion. The groove has a semicircular shape in cross-sectional view. With the tapered surfaces, the metal members are stably joined even when thicknesses of the metal members or a height position of joining is changed. Still further, a plastically fluidized material flows into the groove. A suitable plasticized region is formed by controlling the flow of the plastically fluidized material.

CITATION LIST

Patent Literatures

Patent Literature 1: Japanese Patent Application Publication No. 2013-39613
Patent Literature 2: Japanese Patent No. 4210148

SUMMARY OF THE INVENTION

Problems to be Solved by the Invention

However, with the conventional technology described in Patent Literature 2, the plastically fluidized material flows into the groove formed in the tapered surface, to hinder the groove from functioning. Further, once the plastically fluidized material flows into the groove, the metal members are subjected to friction stir joining in a state where the plastically fluidized material is adhered to the groove. Therefore, there is a problem that the joined metal members are rubbed with the adhered material so that joining quality is deteriorated. Still further, the front surfaces of the joined metal members are made coarse, more burrs are generated, and the recessed groove in the front surfaces of the metal members is formed larger.

From such a point of view, the present invention is intended to provide a method for manufacturing a liquid cooling jacket having a smaller recessed groove formed in front surfaces of metal members and having a joined surface made less coarse.

Means to Solve the Problems

In order to solve such problems, the present invention provides a method for manufacturing a liquid cooling jacket, the liquid cooling jacket including a jacket body and a sealing body, the jacket body including a bottom portion, a peripheral wall portion rising from a peripheral edge of the bottom portion, and a columnar support rising from the bottom portion, the sealing body having a hole portion into which a distal end of the columnar support is inserted, and sealing an opening of the jacket body, the jacket body being joined to the sealing body by friction stirring, the method including steps of: preparing for forming a peripheral wall stepped portion including a stepped bottom surface and a stepped side surface rising from the stepped bottom surface on an inner peripheral edge of the peripheral wall portion, forming a columnar support end surface of the columnar support so as to have the same height as a peripheral wall end surface of the peripheral wall portion, and forming a columnar support stepped portion including a stepped bottom surface and a stepped side surface rising from the stepped bottom surface on an outer periphery of a distal end of the columnar support; placing the sealing body in the jacket body; first primary joining for performing friction stirring to a first abutted portion, where the stepped side surface of the peripheral wall stepped portion is abutted with an outer peripheral side surface of the sealing body, with a rotary tool being moved around the first abutted portion by one lap; and second primary joining for performing friction stirring to a second abutted portion, where the stepped side surface of the columnar support stepped portion is abutted with a hole wall of a hole portion, with a rotary tool being moved around the second abutted portion by one lap, wherein the rotary tool is a primary joining rotary tool for friction stirring to include a base end pin and a distal end pin, wherein a taper angle of the base end pin is larger than a taper angle of the distal end pin, the base end pin includes a pin stepped portion in a stepped shape formed on an outer peripheral surface thereof, and the distal end pin includes a flat surface perpendicular to a rotation axis of the rotary tool and includes a protrusion protruding from the flat surface, and wherein, in the first primary joining and the second primary joining, the friction stirring is performed in a state where the jacket body and the sealing body are brought in contact with the flat surface of the distal end pin and the base end pin, and only the jacket body is brought in contact with a distal end surface of the protrusion.

Further, the present invention provides a method for manufacturing a liquid cooling jacket, the liquid cooling jacket including a jacket body and a sealing body, the jacket body including a bottom portion, a peripheral wall portion rising from a peripheral edge of the bottom portion, and a columnar support rising from the bottom portion, the sealing body sealing an opening of the jacket body, the jacket body being joined to the sealing body by friction stirring, the method including steps of: preparing for forming a peripheral wall stepped portion including a stepped bottom surface and a stepped side surface rising from the stepped bottom surface on an inner peripheral edge of the peripheral wall portion, and forming a columnar support end surface of the columnar support so as to have the same height as the stepped bottom surface of the peripheral wall stepped portion; placing the sealing body in the jacket body; first primary joining of performing friction stirring to a first abutted portion, where the stepped side surface of the peripheral wall stepped portion is abutted with an outer peripheral side surface of the sealing body, with a rotary tool being moved around the first abutted portion by one lap; and second primary joining of performing friction stirring to an overlapped portion, where the columnar support end surface of the columnar support is overlapped with a rear surface of the sealing body, with a rotary tool being moved around the overlapped portion, wherein the rotary tool is a primary joining rotary tool for friction stirring to include a base end pin and a distal end pin, wherein a taper angle of the base end pin is larger than a taper angle of the distal end pin, the base end pin includes a pin stepped portion in a stepped shape formed on an outer peripheral surface thereof, and the distal end pin includes a flat surface perpendicular to a rotation axis of the rotary tool and includes a protrusion protruding from the flat surface, and wherein, in the first primary joining, the friction stirring is performed in a state where the jacket body and the sealing body are brought in contact with the flat surface of the distal end pin and the base end pin, and only the jacket body is brought in contact with a distal end surface of the protrusion, and in the second primary joining, the friction stirring is performed in a state where the sealing body is brought in contact with the flat surface of the distal end pin and the base end pin, and the jacket body is brought in contact with the distal end surface of the protrusion.

According to the joining method described above, the sealing body is pressed by the outer peripheral surface of the base end pin having a large taper angle so that the recessed groove of the joined front surface is made small, and the bulged portions formed on sides of the recessed groove is not formed or made small. The stepped portion in a stepped shape is shallow and has a wide exit angle so that the plastically fluidized material is hardly adhered to the outer peripheral surface of the base end pin even when the plastically fluidized material is pressed by the base end pin.

Accordingly, the joined surface is made less coarse and joining quality is suitably stabilized. Further, the distal end pin is easily inserted to a deeper position. Still further, with the protrusion of the rotary tool, joining strength of the first abutted portion, the second abutted portion, and the overlapped portion is further increased.

Further, in the preparing described above, the jacket body is preferably formed by die-casting to have the bottom portion formed to be convex toward the front surface of the jacket body, and the sealing body is preferably formed to be convex toward a front surface thereof.

There is a risk that heat input at the time of friction stir joining causes heat contraction in the plasticized regions and the sealing body of the liquid cooling jacket to be deformed in a concave shape. However, according to the manufacturing method, the jacket body and the sealing body are formed in a convex shape in advance, and heat contraction is used to make the liquid cooling jacket flat.

Further, an amount of deformation of the jacket body is preferably measured in advance, and in the first primary joining and the second primary joining, the friction stirring is performed while an insertion depth of the rotary tool is adjusted in accordance with the amount of deformation.

According to the manufacturing method, even when the jacket body and the sealing body are curved in a convex shape for friction stir joining, a length and a width of the plasticized region formed in the liquid cooling jacket are kept constant.

Further, in the first invention of the present application, the method preferably includes provisional joining of provisionally joining at least either one of the first abutted portion and the second abutted portion prior to the first primary joining and the second primary joining.

Still further, in the second invention of the present application, the method preferably includes provisional joining of provisionally joining the first abutted portion prior to the first primary joining.

According to the manufacturing method, performing the provisional joining prevents the abutted portions from coming apart in the first primary joining and the second primary joining.

Further, in the first primary joining and the second primary joining, a cooling plate, in which a cooling medium flows, is preferably arranged to face a rear surface of the bottom portion, and the friction stirring is performed while the jacket body and the sealing body are cooled by the cooling plate.

According to the manufacturing method, frictional heat is kept low so that deformation of the liquid cooling jacket due to thermal contraction is reduced.

Further, a front surface of the cooling plate is preferably brought in surface-contact with a rear surface of the bottom portion. According to the manufacturing method, cooling efficiency is improved.

Further, the cooling plate preferably has a cooling flow path in which the cooling medium flows, and the cooling flow path has a planar shape to follow a moving trace of the rotary tool in the first primary joining.

According to the manufacturing method, a portion to be subjected to friction stirring is intensively cooled, to more improve the cooling efficiency.

Further, the cooling flow path, in which the cooling medium flows, is preferably formed of a cooling pipe embedded in the cooling plate. According to the manufacturing method, control of a cooling medium is easily performed.

Further, in the first primary joining and the second primary joining, a cooling medium preferably flows in a hollow portion defined by the jacket body and the sealing body, and friction stirring is performed while the jacket body and the sealing body are cooled.

According to the manufacturing method, frictional heat is kept low so that deformation of the liquid cooling jacket due to thermal contraction is reduced. Further, according to the method, the jacket body is cooled by itself without using a cooling plate or the like.

Advantageous Effects of the Invention

According to the method for manufacturing a liquid cooling jacket of the present invention, the recessed groove formed in the front surfaces of the metal members is made smaller and the joined surface is made less coarse.

EMBODIMENTS OF THE INVENTION

First Embodiment

A description is given of a liquid cooling jacket and a method for manufacturing a liquid cooling jacket according to a first embodiment of the present invention with reference to the accompanying drawings. First, a primary joining rotary tool and a provisional joining rotary tool used in the present embodiment are described.

Figure 1:
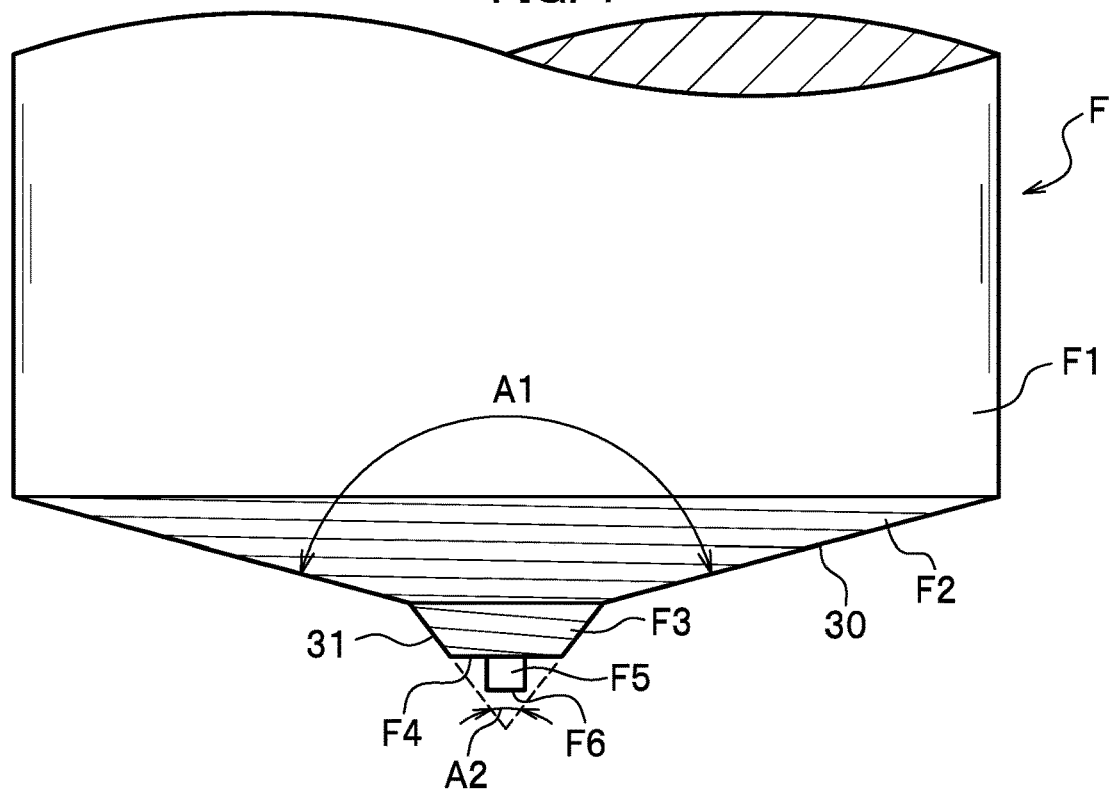
FIG. 1 is a side view of a primary joining rotary tool according to an embodiment of the present invention.

As illustrated in FIG. 1, a primary joining rotary tool (rotary tool) F is a tool used for friction stir joining. The primary joining rotary tool F is formed of tool steel, for example. The primary joining rotary tool F mainly includes a base shaft portion F1, a base end pin F2, and a distal end pin F3. A protrusion F5 is formed at a distal end of the distal end pin F3.

The base shaft portion F1 is a portion which has a columnar shape and is connected to a main shaft of a friction stirring apparatus. A rotation axis of the primary joining rotary tool F may be inclined with respect to the vertical direction, but coincides with the vertical direction in the present embodiment. Further, a surface perpendicular to the vertical direction is defined as the horizontal plane.

Figure 3:
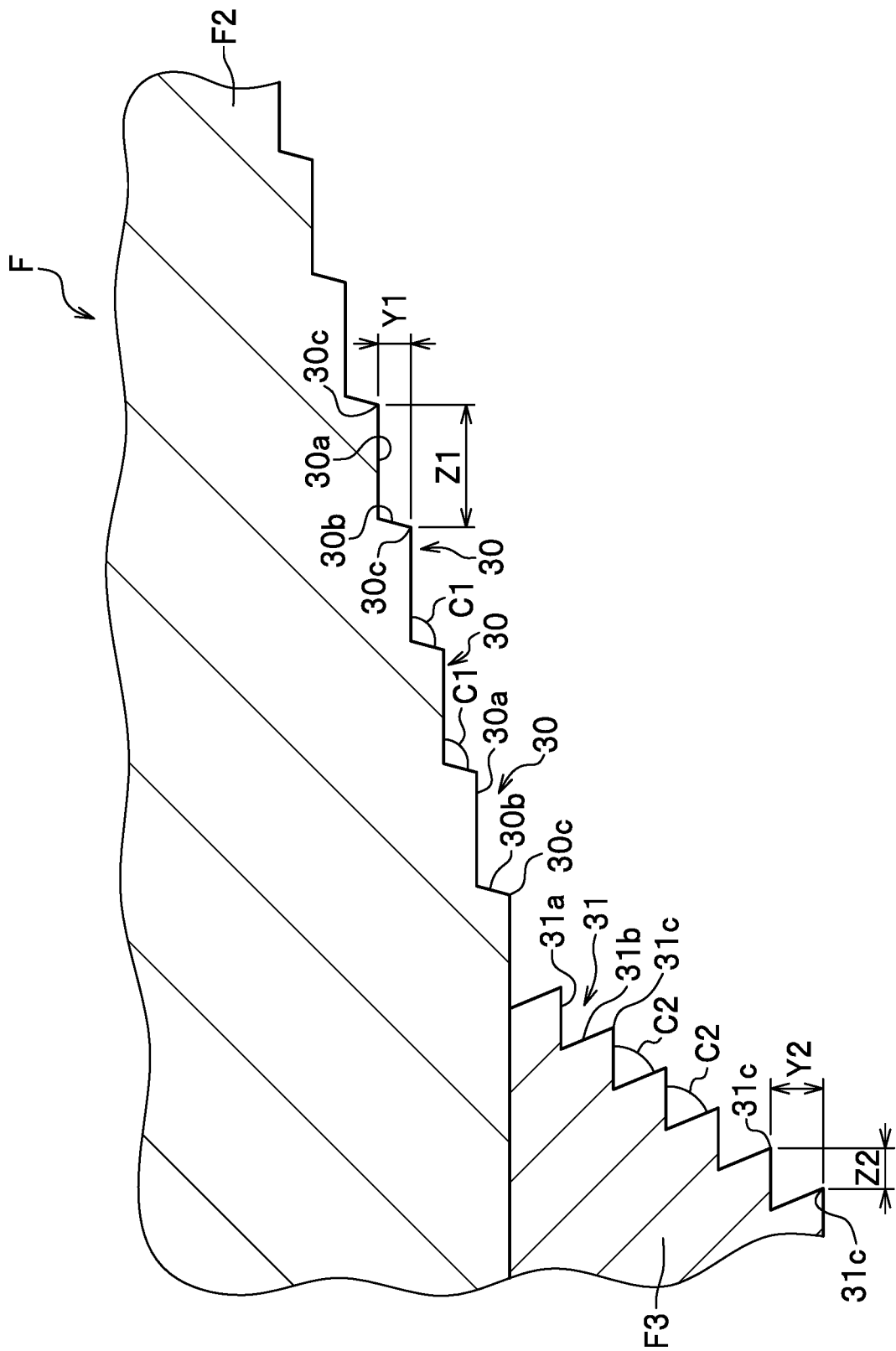
FIG. 3 is an enlarged cross-sectional view of the primary joining rotary tool.

The base end pin F2 is continuous to the base shaft portion F1 and is tapered off toward the distal end thereof. The base end pin F2 has a frustoconical shape. A taper angle A1 of the base end pin F2 may be set as appropriate, and is set at an angle of 135° to 160°, for example. When the taper angle A1 is less than an angle of 135° or more than an angle of 160°, a joined surface after friction stirring is made coarse. The taper angle A1 is larger than a taper angle A2 of the distal end pin F3 to be described below. As illustrated in FIG. 3, a pin stepped portion 30 in a stepped shape is formed on an outer peripheral surface of the base end pin F2 over an entire height direction thereof. The pin stepped portion 30 is spirally formed clockwise or counterclockwise. That is, the pin stepped portion 30 has a spiral shape in planar view and has a stepped shape in side view. In the present embodiment, the rotary tool is rotated clockwise so that the pin stepped portion 30 is formed counterclockwise from the base end toward the distal end.

In a case where the primary joining rotary tool F is rotated counterclockwise, the pin stepped portion 30 is preferably formed clockwise from the base end toward the distal end. With the structure, a plastically fluidized material flows toward the distal end through the pin stepped portion 30 so that metal overflowing outside the joined metal members is reduced. The pin stepped portion 30 includes a stepped bottom surface 30a and a stepped side surface 30b. A distance Z1 (horizontal distance) between adjacent ridges 30c of the pin stepped portion 30 is appropriately set in association with a stepped angle C1 to be described below and a height Y1 of the stepped side surface 30b to be described below.

The height Y1 of the stepped side surface 30b may be appropriately set, and is set to 0.1 mm to 0.4 mm, for example. When the height Y1 is less than 0.1 mm, the joined surface is made coarse. Meanwhile, when the height Y1 exceeds 0.4 mm, the joined surface is likely made coarse, and the number of effective stepped portions (the number of pin stepped portions 30 being in contact with the joined metal members) is reduced.

The stepped angle C1 defined by the stepped bottom surface 30a and the stepped side surface 30b may be set as appropriate, and is set at an angle of 85 to 120°, for example. The stepped bottom surface 30a is in parallel to the horizontal plane in the present embodiment. The stepped bottom surface 30a may be inclined in a range of an angle of −5° to +15° with respect to the horizontal plane from the rotation axis of the tool toward the outer peripheral direction ("−" indicates downward with respect to the horizontal plane, and "+" indicates upward with respect to the horizontal plane). The distance Z1, the height Y1 of the stepped side surface 30b, the stepped angle C1, and the angle of the stepped bottom surface 30a with respect to the horizontal plane are set as appropriate such that the plastically fluidized material flows outside without accumulating and adhering inside the pin stepped portion 30, and the joined surface is made less coarse by pressing the plastically fluidized material with the stepped bottom surface 30a.

The distal end pin F3 is formed continuously to the base end pin F2. The distal end pin F3 has a frustoconical shape. The distal end of the distal end pin F3 has a flat surface F4 which is flat. The taper angle A2 of the distal end pin F3 is smaller than the taper angle A1 of the base end pin F2. A spiral groove 31 is formed in the outer peripheral surface of the distal end pin F3. The spiral groove 31 may be formed clockwise or counterclockwise. In the present embodiment, the primary joining rotary tool F is rotated clockwise so that the spiral groove 31 is engraved counterclockwise from the base end toward the distal end.

When the primary joining rotary tool F is rotated counterclockwise, the spiral groove 31 is preferably engraved clockwise from the base end toward the distal end. With the structure, the plastically fluidized material flows toward the distal end through the spiral groove 31 so that the metal overflowing outside the joined metal members is reduced. The spiral groove 31 includes a spiral bottom surface 31a and a spiral side surface 31b. A distance (horizontal distance) between adjacent ridges 31c of the spiral groove 31 is referred to as a distance Z2. A height of the spiral side surface 31b is referred to as a height Y2. A spiral angle C2 defined by the spiral bottom surface 31a and the spiral side surface 31b is set at an angle of 45° to 90°, for example. The spiral groove 31 serves to increase frictional heat by coming in contact with the joined metal members and to guide the plastically fluidized material toward the distal end.

Figure 2:
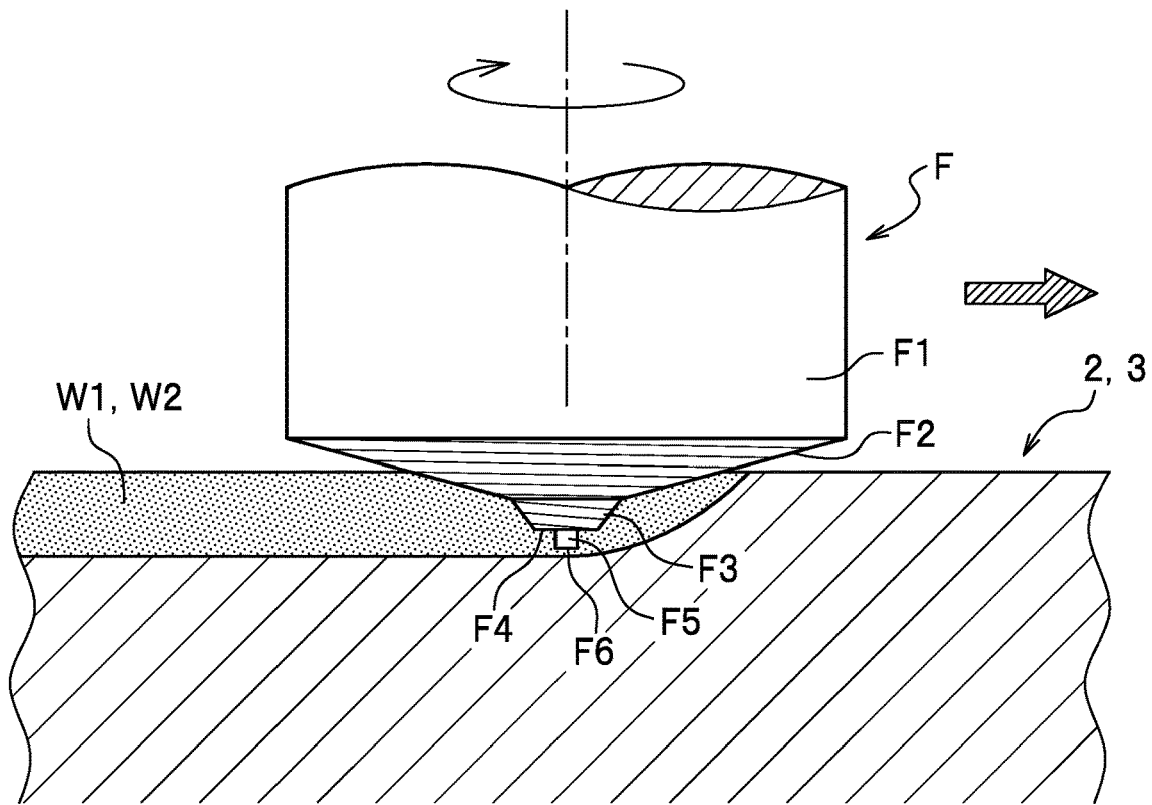
FIG. 2 is a schematic cross-sectional view of a joining mode of the primary joining rotary tool.

As illustrated in FIG. 2, when friction stir joining is performed with the primary joining rotary tool F, surfaces of the joined metal members (a jacket body or a sealing body 3 described below) are pressed by the outer peripheral surface of the base end pin F2 of the primary joining rotary tool F for friction stir joining. An insertion depth of the primary joining rotary tool F is set such that at least a portion of the base end pin F2 comes in contact with the surfaces of the joined metal members. A plasticized region W1 (or plasticized regions W2) is formed of frictionally stirred metal being hardened in a moving trace of the primary joining rotary tool F.

The flat surface F4 is a flat surface perpendicular to the rotation axis. The protrusion F5 is formed at the center of the flat surface F4. A shape of the protrusion F5 is not particularly limited, and is a columnar shape in the present embodiment.

Figure 4:
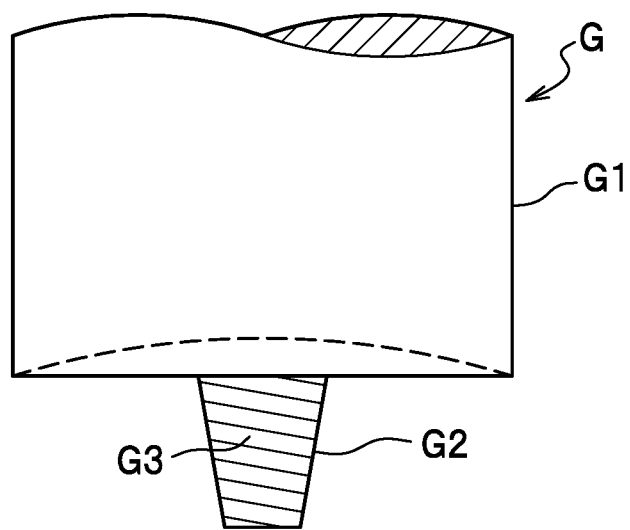
FIG. 4 is a side view of a provisional joining rotary tool according to an embodiment of the present invention.
Figure 5:
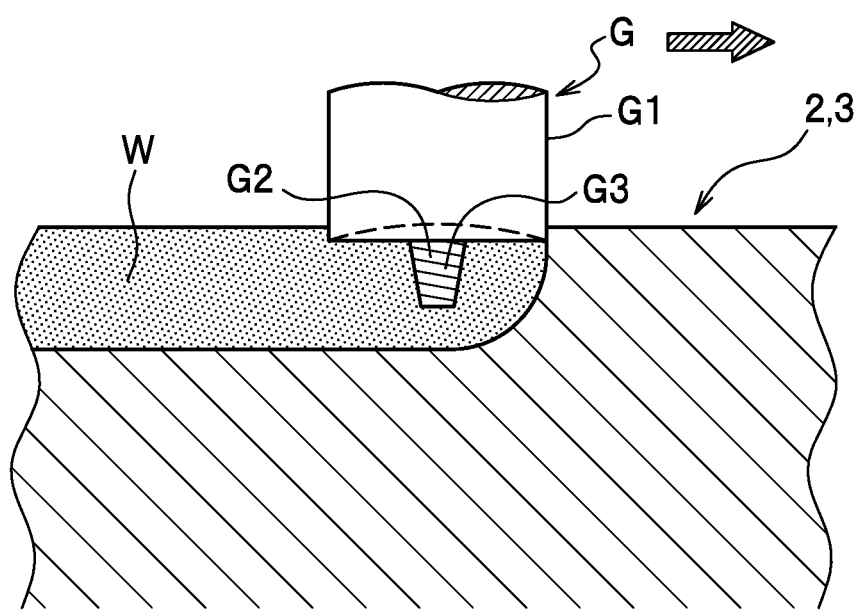
FIG. 5 is a schematic cross-sectional view of a joining mode of the provisional joining rotary tool.

As illustrated in FIG. 4, a provisional joining rotary tool G includes a shoulder portion G1 and a stirring pin G2. The provisional joining rotary tool G is formed of tool steel, for example. As illustrated in FIG. 5, the shoulder portion G1 is a portion which is connected to the main shaft of the friction stirring apparatus and serves to press the plastically fluidized metal. The shoulder portion G1 has a columnar shape. The shoulder portion G1 has a lower end surface in a concave shape to prevent the fluidized metal from flowing outside.

The stirring pin G2 extends downward from the shoulder portion G1 to be coaxial with the shoulder portion G1. The stirring pin G2 is tapered off with the increasing distance from the shoulder portion G1. A spiral groove G3 is engraved in an outer peripheral surface of the stirring pin G2.

As illustrated in FIG. 5, when friction stir joining is performed with the provisional joining rotary tool G, the rotating stirring pin G2 and the lower end surface of the shoulder portions G1 are inserted into and moved in the joined metal members. A plasticized region W is formed of frictionally stirred metal being hardened in a moving trace of the provisional joining rotary tool G.

Figure 6:
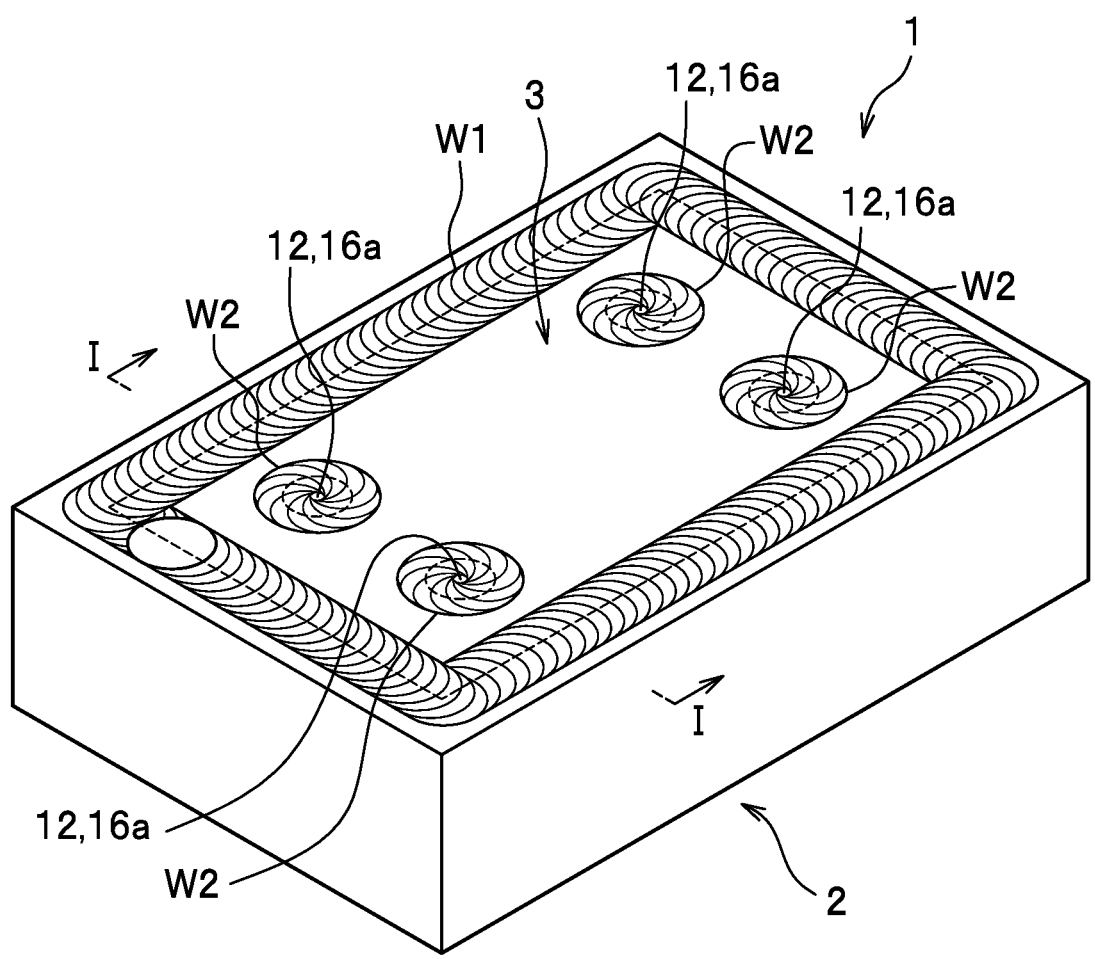
FIG. 6 is a perspective view of a liquid cooling jacket according to a first embodiment of the present invention.

Next, a description is given of a liquid cooling jacket of the present embodiment. As illustrated in FIG. 6, a liquid cooling jacket 1 according to the present embodiment includes a jacket body 2 and a sealing body 3, and has a rectangular parallelepiped shape. The jacket body 2 and the sealing body 3 are integrated by friction stir joining. The liquid cooling jacket 1 has a hollow portion inside and heat transfer fluid such as water is circulated therein. The heat transfer fluid is circulated in the hollow portion so that the liquid cooling jacket 1 allows a heating element mounted thereon, for example, to be cooled.

Figure 7:
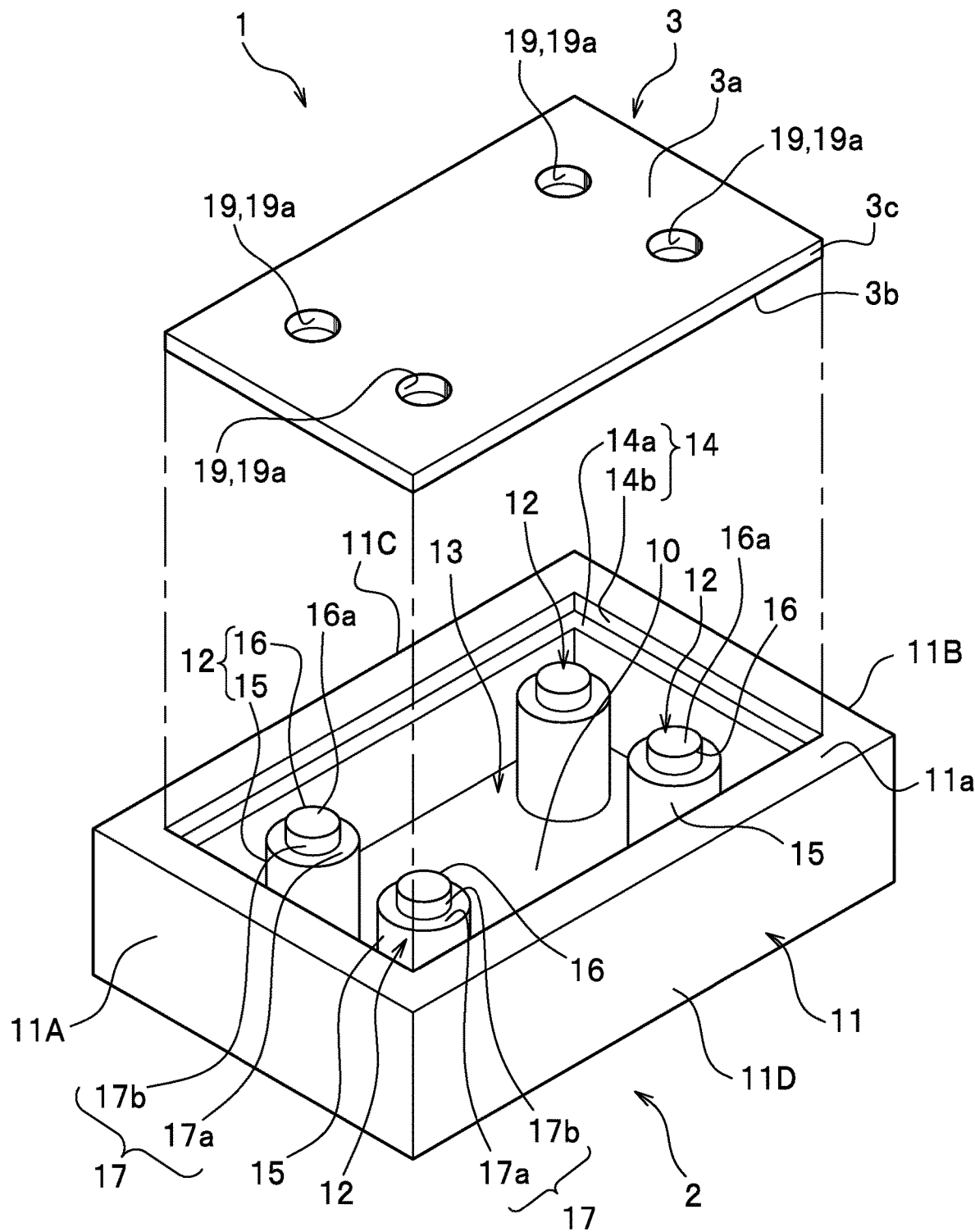
FIG. 7 is an exploded perspective view of the liquid cooling jacket according to the first embodiment of the present invention.

As illustrated in FIG. 7, the jacket body 2 is a box-shaped body whose top is open. The jacket body 2 includes a bottom portion 10, a peripheral wall portion 11, and a plurality of columnar supports 12. A material of the jacket body 2 is appropriately selected from friction stirrable metal such as aluminum, an aluminum alloy, copper, a copper alloy, titanium, a titanium alloy, magnesium, and a magnesium alloy. In the present embodiment, the jacket body 2 is made of an aluminum alloy which is the same material as the sealing body 3, but an aluminum alloy casting material (such as JIS AC4C, ADC12) may be used.

The bottom portion 10 has a rectangular plate shape in planar view. The peripheral wall portion 11 stands on a peripheral edge of the bottom portion 10, and has a rectangular frame shape in planar view. The peripheral wall portion 11 is formed of wall portions 11A, 11B, 11C, and 11D, each having the same thickness. The wall portions 11A and 11B are short side portions which face to each other. Further, the wall portions 11C and 11D are long side portions which face to each other. A recessed portion 13 is defined inside the bottom portion 10 and the peripheral wall portion 11.

A peripheral wall stepped portion 14 is formed in a peripheral wall end surface 11a as an end surface of the peripheral wall portion 11 along an inner peripheral edge of the peripheral wall portion 11 of the jacket body 2. The peripheral wall stepped portion 14 is formed of a stepped bottom surface 14a and a stepped side surface 14b standing on the stepped bottom surface 14a. The stepped bottom surface 14a is formed at a position one step lower than the peripheral wall end surface 11a.

The columnar supports 12 are provided to stand on the bottom portion 10 and has a columnar shape. The number of columnar supports 12 is not limited as long as one or more columnar supports are arranged, and four columnar supports are arranged in the present embodiment. The columnar supports 12 each have the same shape. Each of the columnar supports 12 has a large-diameter portion 15 and a small-diameter portion 16 formed so as to protrude at a distal end of the large-diameter portion 15. Both the large-diameter portion 15 and the small-diameter portion 16 have a columnar shape. A columnar support stepped portion 17 is formed on a step between the large-diameter portion 15 and the small-diameter portion 16.

The columnar support stepped portion 17 has a stepped bottom surface 17a and a stepped side surface 17b rising from the stepped bottom surface 17a. A columnar support end surface 16a is formed at an end surface of the small-diameter portion 16. The stepped bottom surface 17a is formed to have the same height as the stepped bottom surface 14a of the peripheral wall stepped portion 14. Further, the columnar support end surface 16a is formed to have the same height as the peripheral wall end surface 11a.

The sealing body 3 is a rectangular plate-shaped member in planar view to seal the opening of the jacket body 2. In the present embodiment, the sealing body 3 is made of an aluminum alloy which is the same material as that of the jacket body 2, but an aluminum alloy malleable material (such as JIS A1050, A1100, and A6063) may be used. The sealing body 3 is formed to have a size to be placed in the peripheral wall stepped portion 14 without any gap. A thickness of the sealing body 3 is approximately the same height of the stepped side surface 14b. The sealing body 3 has four hole portions 19 formed therein, which correspond to the columnar supports 12. The hole portion 19 has a circular shape in planar view and the small-diameter portion 16 is inserted therein.

Figure 8:
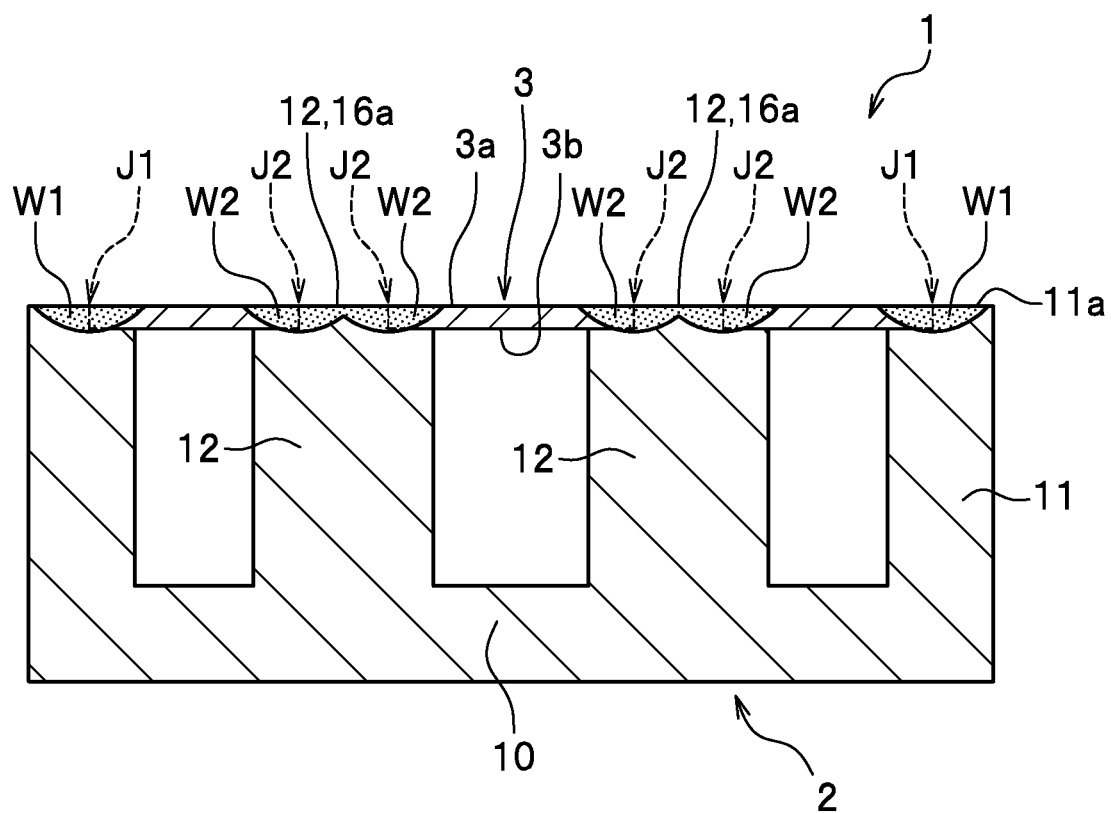
FIG. 8 is a cross-sectional view taken along a line I-I in FIG. 6.

As illustrated in FIG. 8, the liquid cooling jacket 1 is formed of the jacket body 2 and the sealing body 3 being integrally joined together by friction stirring. The liquid cooling jacket 1 is joined by friction stirring, respectively, at a first abutted portion J1, where the stepped side surface 14b of the peripheral wall stepped portion 14 is abutted with an outer peripheral side surface 3c of the sealing body 3, and at four second abutted portions J2, where the stepped side surfaces 17b of the columnar support stepped portions 17 are abutted with the hole walls 19a of the hole portions 19. The plasticized region W1 is formed at the first abutted portion J1 and the plasticized region W2 is formed in the second abutted portions J2. The hollow portion, in which the heat transfer fluid circulates to transport heat outside, is formed inside the liquid cooling jacket 1.

Next, a description is given of a method for manufacturing a liquid cooling jacket (a method for manufacturing a liquid cooling jacket having a heating element) according to the first embodiment. The method for manufacturing a liquid cooling jacket includes a preparing step, a placing step, a fixing step, a provisional joining step, a first primary joining step, a second primary joining step, a hole-forming step, a burr removing step, and a mounting step.

As illustrated in FIG. 7, the preparing step is a step of forming the jacket body 2 and the sealing body 3. The jacket body 2 is formed by die-casting, for example.

Figure 9:
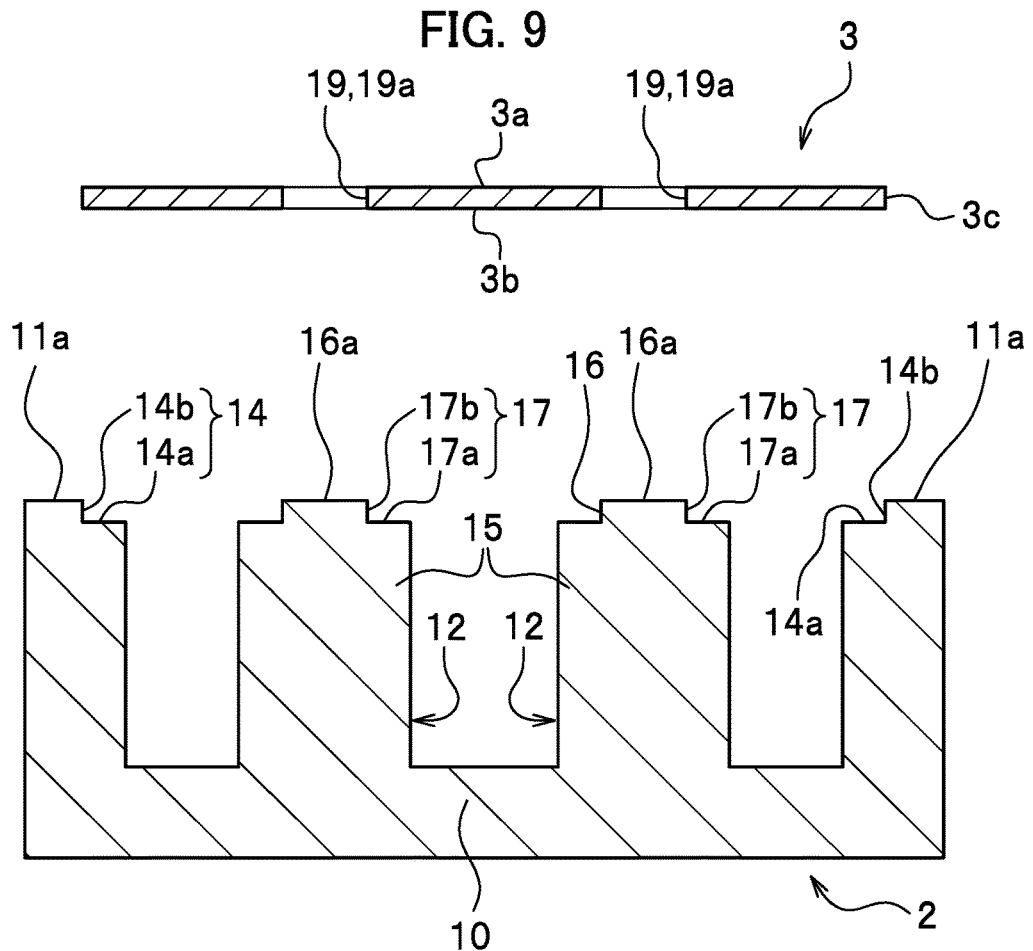
FIG. 9 is a cross-sectional view of the liquid cooling jacket before a placing step of a method for manufacturing the same according to the first embodiment.
Figure 10:
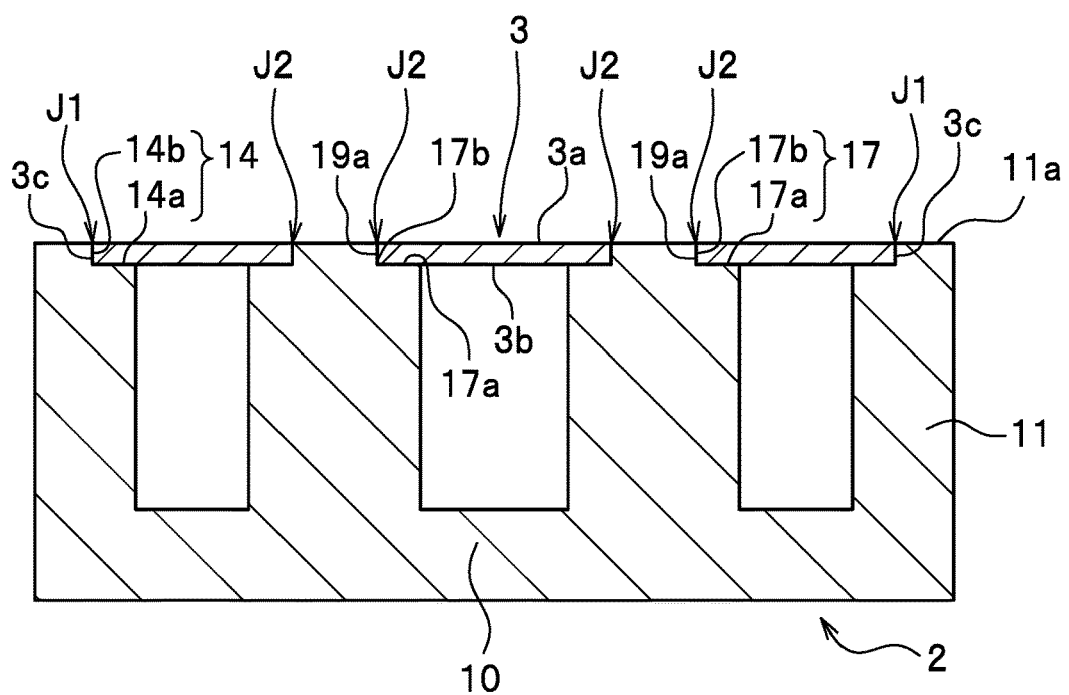
FIG. 10 is a cross-sectional view of the liquid cooling jacket after the placing step of the method for manufacturing the same according to the first embodiment.

As illustrated in FIGS. 9 and 10, the placing step is a step of placing the sealing body 3 in the jacket body 2 while the small-diameter portions 16 of the columnar supports 12 are inserted into the hole portions 19 of the sealing body 3. A rear surface 3b of the sealing body 3 is brought in surface-contact with the stepped bottom surface 14a of the peripheral wall stepped portion 14 and the stepped bottom surfaces 17a of the columnar support stepped portions 17, respectively. The placing step makes the stepped side surface 14b of the stepped portion 14 abut with the outer peripheral side surface 3c of the sealing body 3 to form the first abutted portion J1. The first abutted portion J1 has a rectangular frame shape in planar view. Further, the placing step makes the stepped side surfaces 17b of the columnar support stepped portions 17 abut with the hole walls 19a of the hole portions 19 to form the second abutted portions J2. The second abutted portion J2 has a circular shape in planar view.

The jacket body 2 and the sealing body 3 are fixed to a table (not shown) in the fixing step. The jacket body 2 and the sealing body 3 are immovably fixed to the table with fixing jigs such as clamps.

Figure 11:
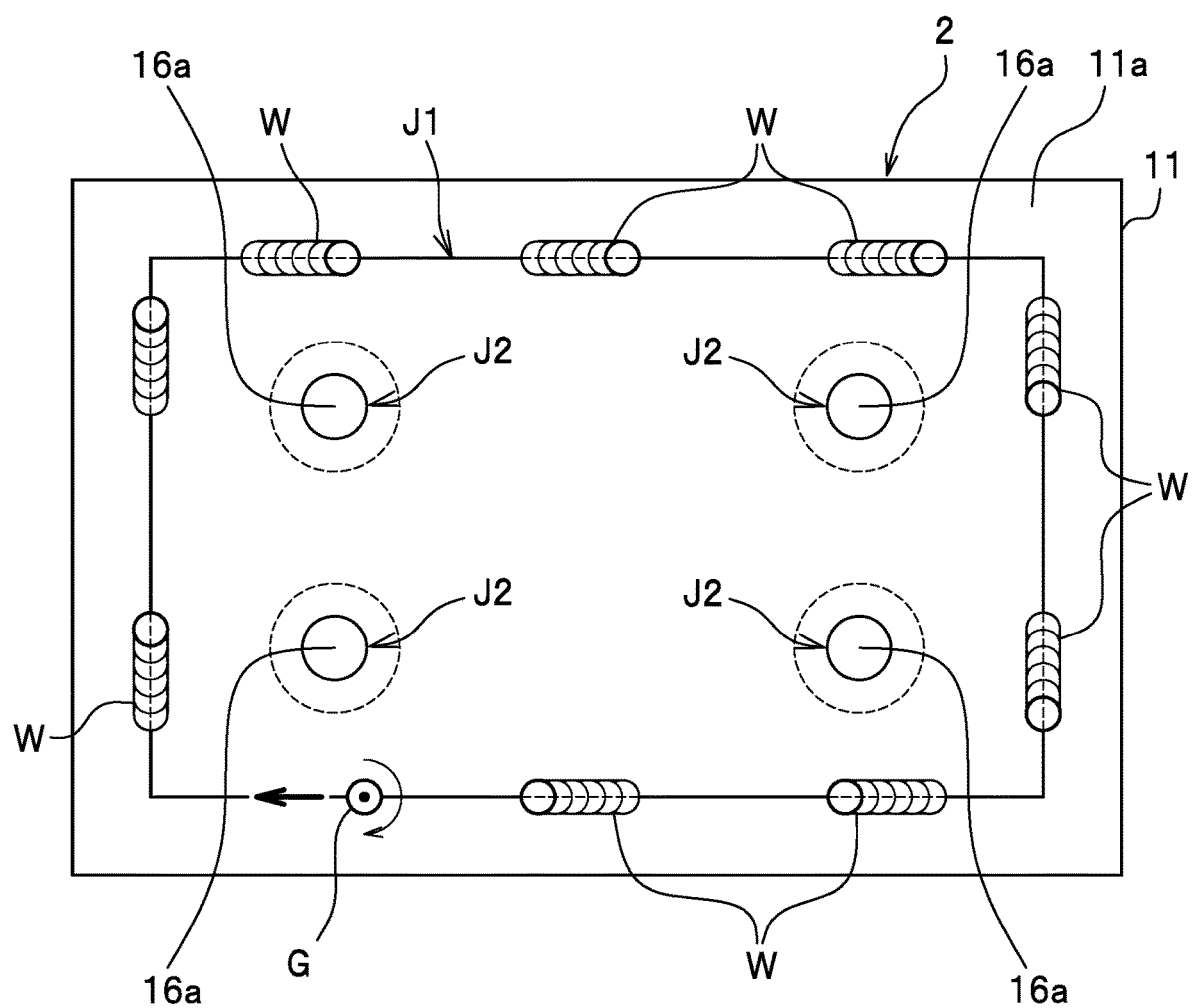
FIG. 11 is a plan view of the liquid cooling jacket in a provisional joining step of the method for manufacturing the same according to the first embodiment.

As illustrated in FIG. 11, the provisional joining step is a step of provisionally joining the jacket body 2 to the sealing body 3. In the provisional joining step, friction stir joining is performed to the first abutted portion J1 with the provisional joining rotary tool G. The plasticized region W is formed in the moving trace of the provisional joining rotary tool G. The provisional joining may be performed continuously or intermittently as illustrated in FIG. 11. The provisional joining rotary tool G is small so that thermal deformation of the jacket body 2 and the sealing body 3 in the provisional joining is reduced.

Figure 12:
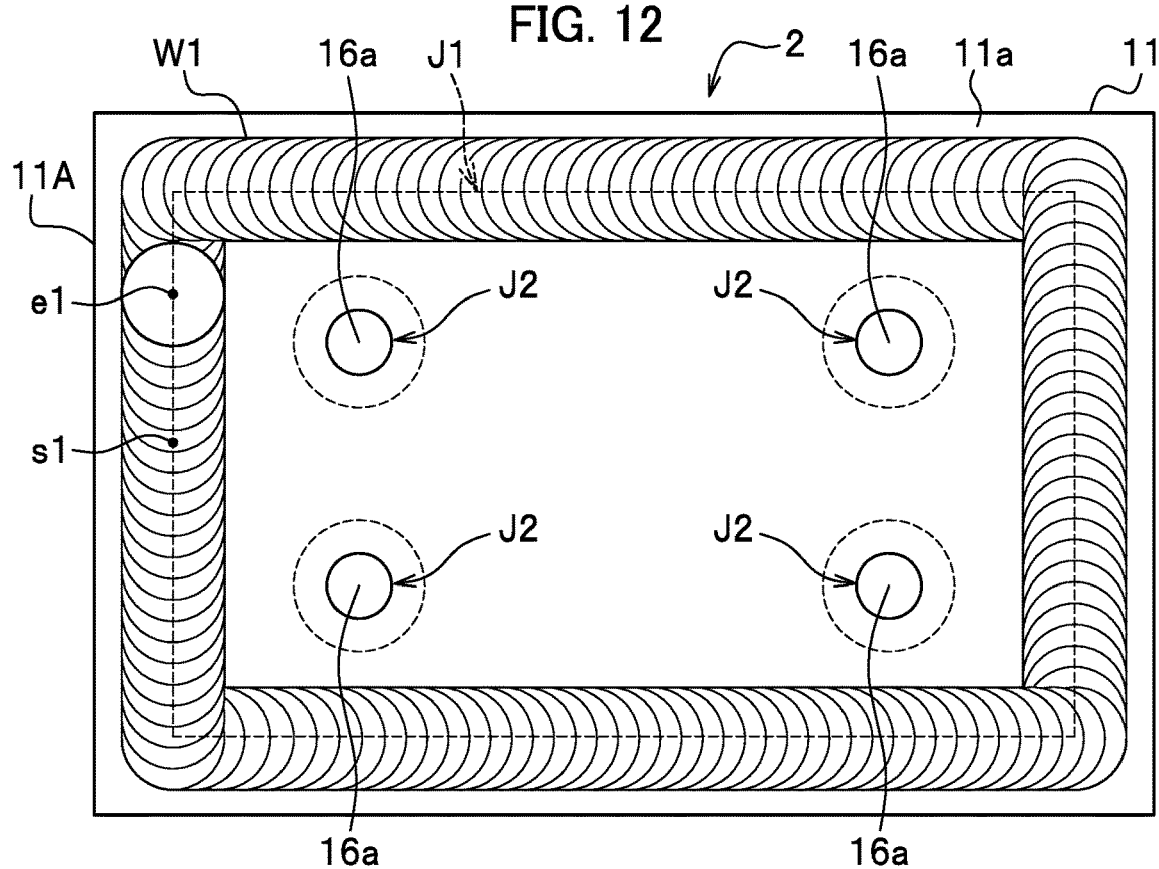
FIG. 12 is a plan view of the liquid cooling jacket in a first primary joining step of the method for manufacturing the same according to the first embodiment.
Figure 13:
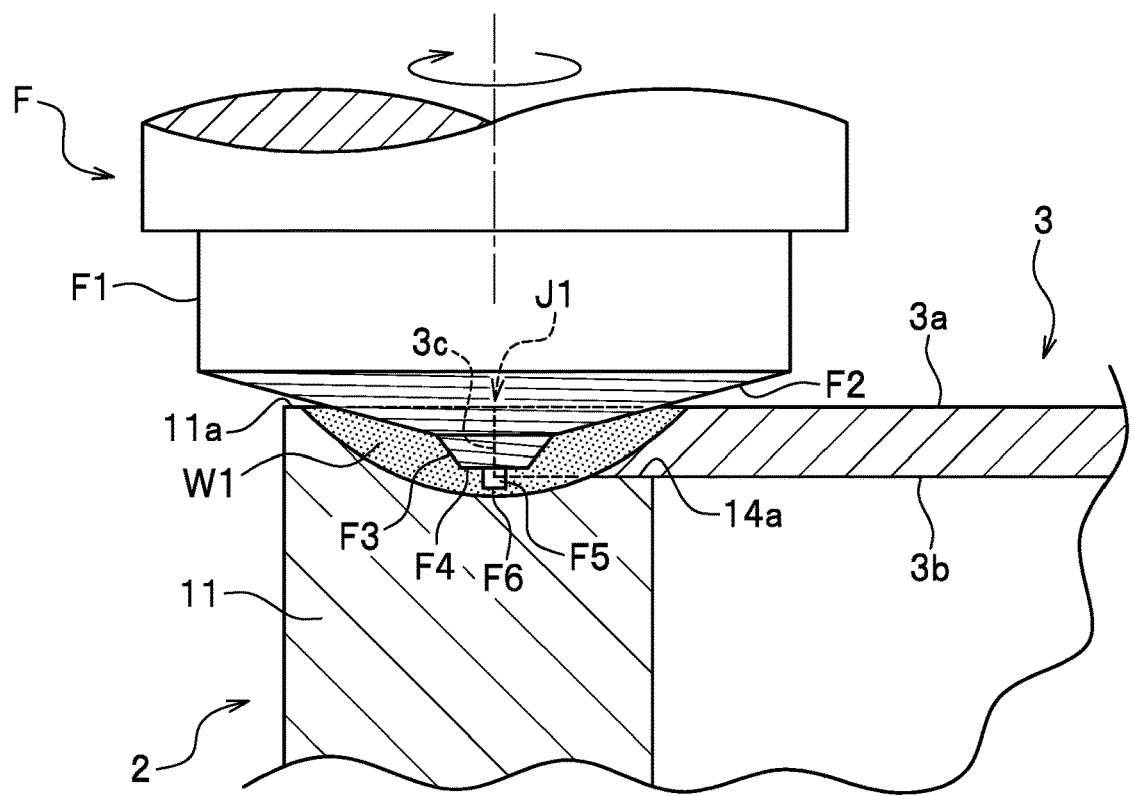
FIG. 13 is a cross-sectional view of the liquid cooling jacket in the first primary joining step of the method for manufacturing the same according to the first embodiment.

As illustrated in FIGS. 12 and 13, the first primary joining step is a step of performing friction stir joining to the first abutted portion J1 with the primary joining rotary tool F. In the first primary joining step, the primary joining rotary tool F, which is rotated clockwise, is inserted in a start position s1 formed at any position on the first abutted portion J1, and is moved clockwise in the first abutted portion J1. That is, the primary joining rotary tool F is moved around by one lap clockwise in a peripheral edge of the sealing body 3. The plasticized region W1 is formed in the moving trace of the primary joining rotary tool F.

As illustrated in FIG. 13, in the first primary joining step, friction stirring is performed in a state where the distal end pin F3 and the base end pin F2 come in contact with the peripheral wall portion 11 of the jacket body 2 and the sealing body 3. In the first primary joining step, friction stir joining is performed while the peripheral wall end surface 11a of the peripheral wall portion 11 and the front surface 3a of the sealing body 3 are pressed by the outer peripheral surface of the base end pin F2 of the primary joining rotary tool F. The insertion depth of the primary joining rotary tool F is set such that at least the plasticized region W1 reaches the stepped bottom surface 14a and at least a part of the base end pin F2 comes in contact with the peripheral wall end surface 11a of the peripheral wall portion 11 and the front surface 3a of the sealing body 3. In the present embodiment, the insertion depth is set such that the distal end pin F3 comes in contact with the sealing body 3 and the peripheral wall portion 11 and a distal end surface F6 of the protrusion F5 comes in contact with only the peripheral wall portion 11. That is, the insertion depth is set such that a side surface of the protrusion F5 is positioned in the stepped bottom surface 14a. Then, the primary joining rotary tool F is moved in a state of having a constant height position to trace the first abutted portion J1.

When the primary joining rotary tool F is moved clockwise around the sealing body 3 as in the present embodiment, the primary joining rotary tool F is preferably rotated clockwise. Meanwhile, when the primary joining rotary tool F is moved counterclockwise around the sealing body 3, the primary joining rotary tool F is preferably rotated counterclockwise.

Joint defects may be generated on the left side in a traveling direction when the primary joining rotary tool F is rotated clockwise and on the right side in the traveling direction when the primary joining rotary tool F is rotated counterclockwise. When the joint defects are generated in the thin sealing body 3, watertightness and airtightness may be degraded. However, by setting the traveling direction and the rotating direction of the primary joining rotary tool F as described above, even if joint defects are generated due to friction stir joining, the defects are generated on the jacket body 2 side having a comparatively large thickness which is far away from the hollow portion of the liquid cooling jacket 1, so that the degradation in watertightness and airtightness is reduced.

As illustrated in FIG. 12, the primary joining rotary tool F is moved around by one lap in the first abutted portion J1 and then is further moved to pass through the start position s1. Then, when reaching an end position e1, the primary joining rotary tool F is moved upward so as to be pulled out of the wall portion 11A.

If a pulled-out mark remains in the peripheral wall end surface 11a of the wall portion 11A and the front surface 3a of the sealing body 3 after the primary joining rotary tool F is pulled out of the wall portion 11A, a repairing step of repairing the pulled-out mark may be performed. In the repairing step, the pulled-out mark is repaired by build-up welding to fill welded metal in the pulled-out mark, for example. Thus, the peripheral wall end surface 11a and the front surface 3a of the sealing body 3 are flattened.

When the primary joining rotary tool F is pulled out of the peripheral wall portion 11, the primary joining rotary tool F is gradually moved upward while being moved on the peripheral wall end surface 11a of the peripheral wall portion 11, for example, so that the insertion depth of the primary joining rotary tool F is gradually shallower. Thus, a pulled-out mark after the first primary joining step does not remain or is made smaller in the peripheral wall end surface 11a and the front surface 3a of the sealing body 3.

Figure 14:
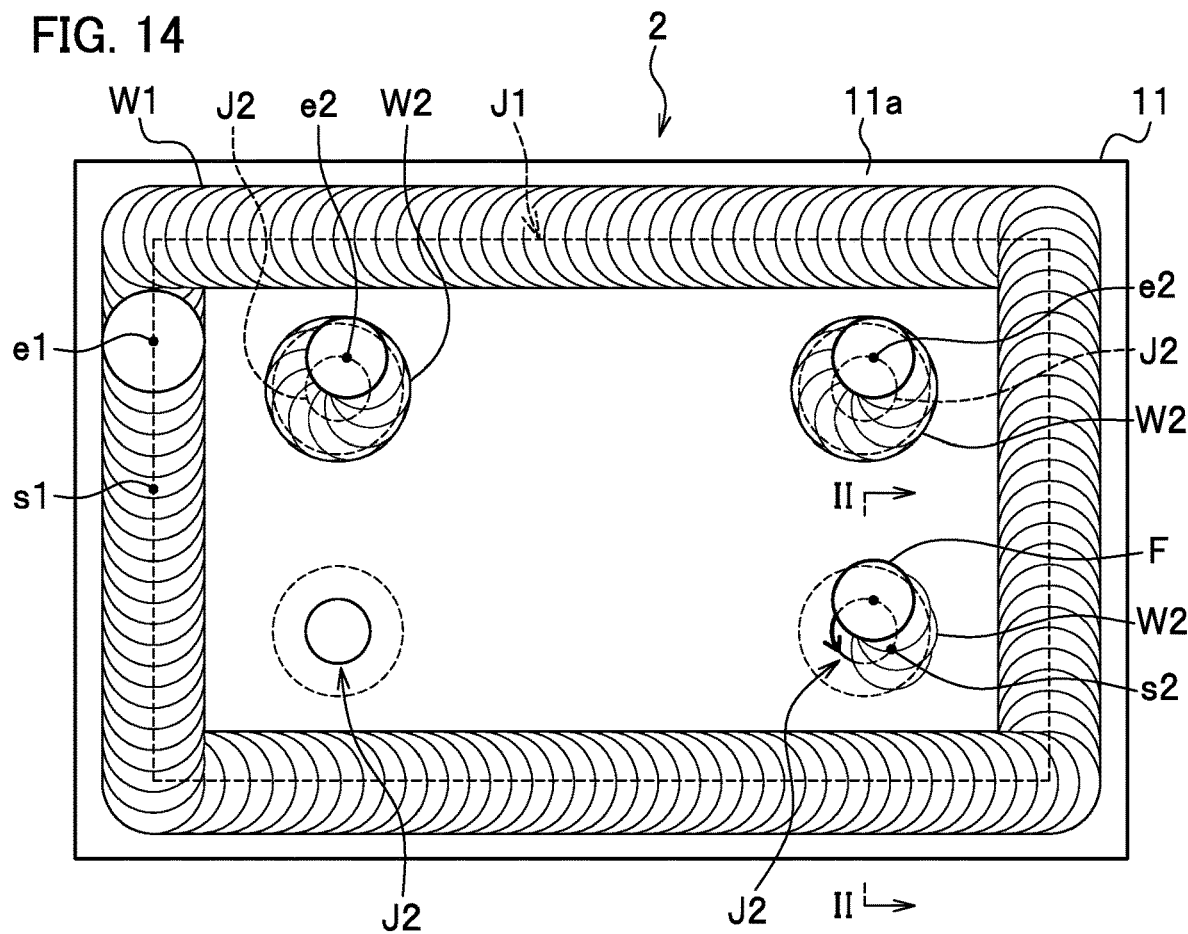
FIG. 14 is a plan view of the liquid cooling jacket in a second primary joining step of the method for manufacturing the same according to the first embodiment.
Figure 15:
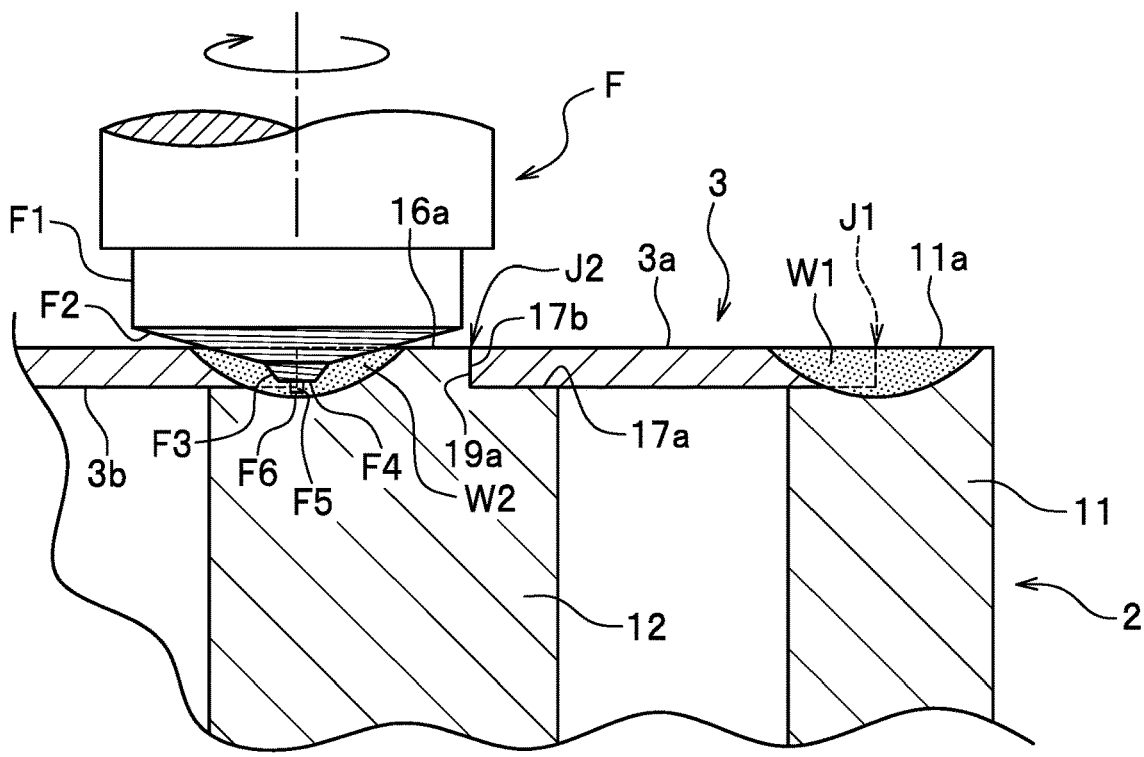
FIG. 15 is a cross-sectional view, taken along a line II-II in FIG. 14, of the liquid cooling jacket in the second primary joining step of the method for manufacturing the same according to the first embodiment.

As illustrated in FIGS. 14 and 15, the second primary joining step is a step of performing friction stir joining to each second abutted portion J2 with the primary joining rotary tool F. In the second primary joining step, the primary joining rotary tool F, which is rotated clockwise, is inserted into a start position s2 formed at any position on the second abutted portion J2, and is moved counterclockwise in the second abutted portion J2. The plasticized region W2 is formed in the second abutted portion J2 through the second primary joining step.

As illustrated in FIG. 15, in the second primary joining step, friction stirring is performed in a state where the distal end pin F3 and the base end pin F2 come in contact with the columnar support 12 of the jacket body 2 and the sealing body 3. In the second primary joining step, friction stir joining is performed while the columnar support end surface 16a of the columnar support 12 and the front surface 3a of the sealing body 3 are pressed by the outer peripheral surface of the base end pin F2 of the primary joining rotary tool F. In the present embodiment, the insertion depth is set such that a vicinity of the center in the height direction of the outer peripheral surface of the base end pin F2 comes in contact with the columnar support end surface 16a of the columnar support 12 and the front surface 3a of the sealing body 3. Further, the insertion depth of the primary joining rotary tool F is set such that the distal end pin F3 comes in contact with both the columnar support 12 and the sealing body 3, and the distal end surface F6 of the protrusion F5 comes in contact with only the columnar support 12. In other words, the insertion depth is set such that the side surface of the protrusion F5 positions in the stepped bottom surface 17a. Then, the primary joining rotary tool F is moved in a state of having a constant height position to trace the second abutted portion J2.

The insertion depth of the primary joining rotary tool F is not necessarily constant. The insertion depth may be changed for the first primary joining step and the second primary joining step.

In the second primary joining step, when the primary joining rotary tool F is moved counterclockwise with respect to the columnar support 12 as in the present embodiment, the primary joining rotary tool F is preferably rotated clockwise. Meanwhile, when the primary joining rotary tool F is moved clockwise with respect to the columnar support 12, the primary joining rotary tool F is preferably rotated counterclockwise. By setting the traveling direction and rotating direction of the primary joining rotary tool F as described above, even if joint defects are generated due to friction stir joining, the defects are generated on the columnar support 12 side having a relatively large thickness which is far away from the hollow portion of the liquid cooling jacket 1, so that the degradation in watertightness and airtightness is reduced.

As illustrated in FIG. 14, the primary joining rotary tool F is moved around by one lap in the second abutted portion J2 and then is continuously moved to pass through the start position s2. Then, the primary joining rotary tool F is moved to the end position e2 set on the second abutted portion J2. When reaching the end position e2, the primary joining rotary tool F is moved upward so as to be pulled out of the second abutted portion J2.

If a pulled-out mark remains in the second abutted portion J2 after the primary joining rotary tool F is pulled out of the second abutted portion J2, a repairing step of repairing the pulled-out mark may be performed. In the repairing step, the pulled-out mark is repaired by build-up welding to fill welded metal in the pulled-out mark, for example. Thus, the front surface 3a of the sealing body 3 and the columnar support end surface 16a of the columnar support 12 are flattened.

When the primary joining rotary tool F is pulled out of the second abutted portion J2, the primary joining rotary tool F may be shifted toward the center of the columnar support 12 and then pulled out of the columnar support 12. Further, when the primary joining rotary tool F is pulled out of the second abutted portion J2, the primary joining rotary tool F may gradually be moved upward while being moved on the second abutted portion J2 or the columnar support end surface 16a, for example, so that the insertion depth of the primary joining rotary tool F is gradually shallower. Thus, a pulled-out mark after the second primary joining step does not remain or is made smaller in the front surface 3a of the sealing body 3 or the columnar support end surface 16a of the columnar support 12.

Figure 16:
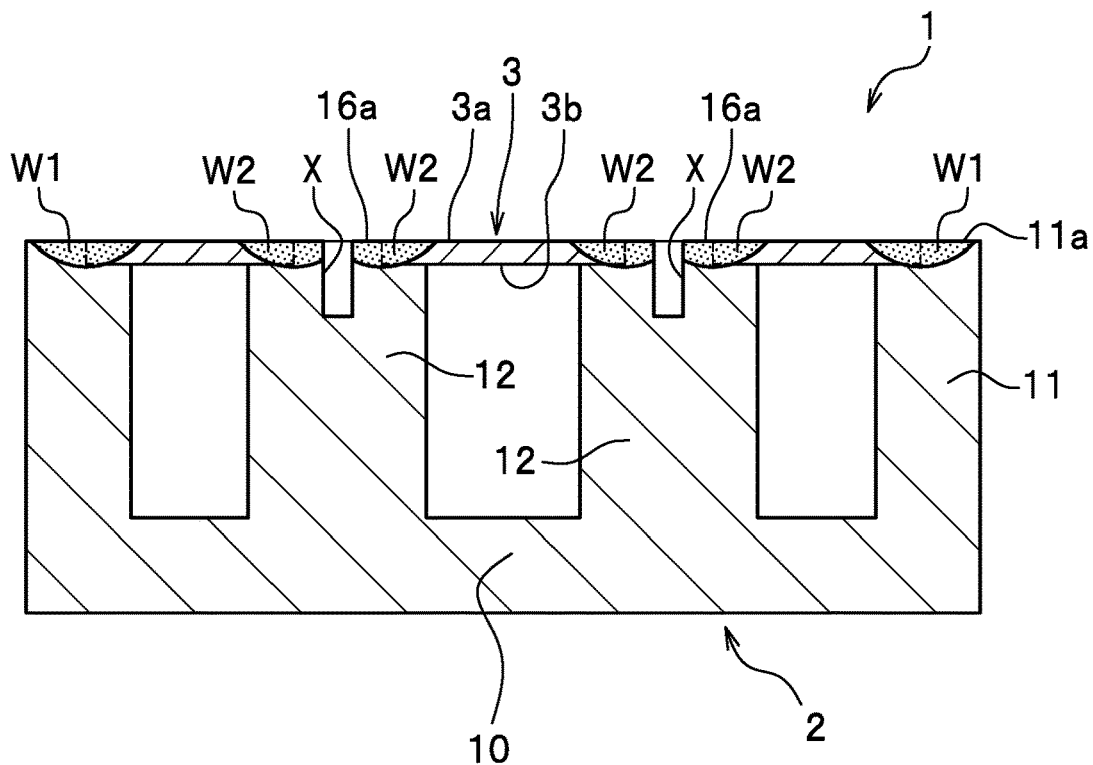
FIG. 16 is a cross-sectional view of the liquid cooling jacket in a hole-forming step of the method for manufacturing the same according to the first embodiment.

As illustrated in FIG. 16, the hole-forming step is a step of forming fixing holes X for mounting a heating element H on each columnar support 12. The fixing holes X are each formed to penetrate a part of the plasticized region W2 so as to reach the columnar supports 12.

In the burr removing step, burrs, which are formed through the first primary joining step, the second primary joining step, and the hole-forming step, exposed on the front surfaces of the jacket body 2 and the sealing body 3 are removed. With the step, the front surfaces of the jacket body 2 and the sealing body 3 are clearly finished.

Figure 17:
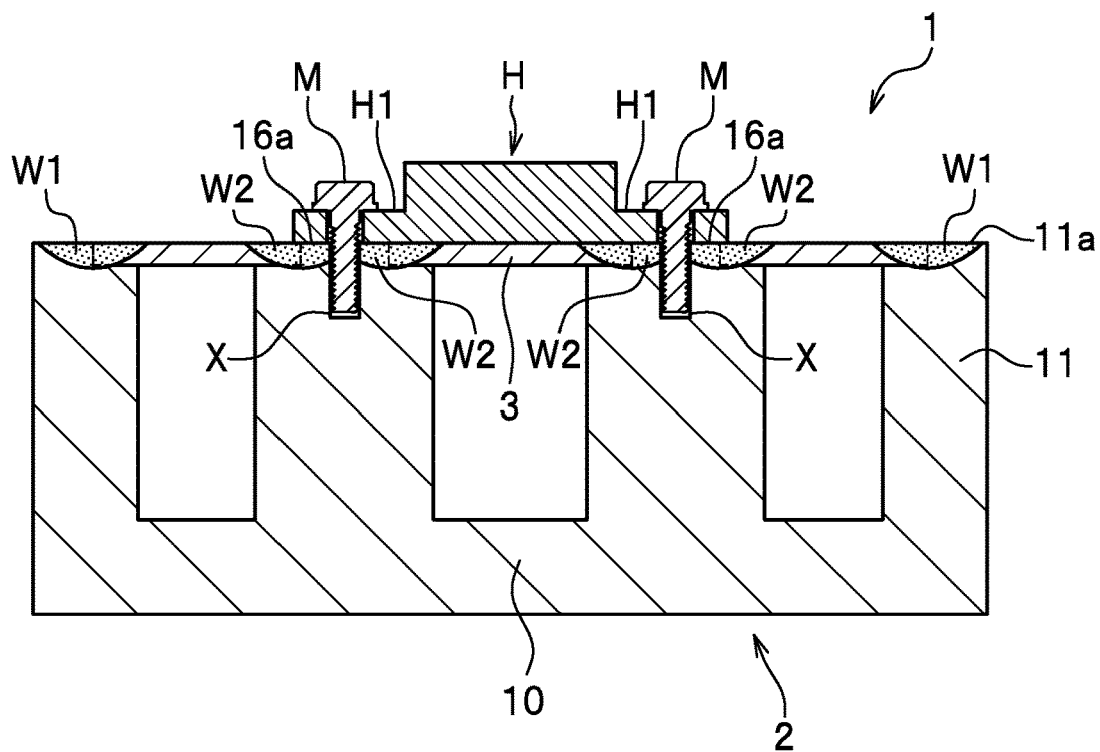
FIG. 17 is a cross-sectional view of the liquid cooling jacket in a mounting step of the method for manufacturing the same according to the first embodiment.

As illustrated in FIG. 17, the mounting step is a step of mounting the heating element H with fitting members M. When the heating element H is mounted, through holes formed in a flange H1 of the heating element H are communicated with the fixing holes X and the heating element H is fixed with the fitting members M such as screws. The fitting members M are each inserted to a position reaching the columnar supports 12.

In the present embodiment, the fixing holes X are formed in the sealing body 3 side to have the heating element H mounted thereon, but the fixing holes X reaching the columnar supports 12 may be formed in the bottom portion 10 to have the heating element H mounted thereon. The heating element H merely needs to be mounted on at least one of the sealing body 3 and the bottom portion 10. Further, in the present embodiment, the fixing holes X are formed, but the heating element H may be fixed with the fitting members M without the fixing holes X being formed.

Next, an advantageous effect of the present embodiment is described.

Figure 18:
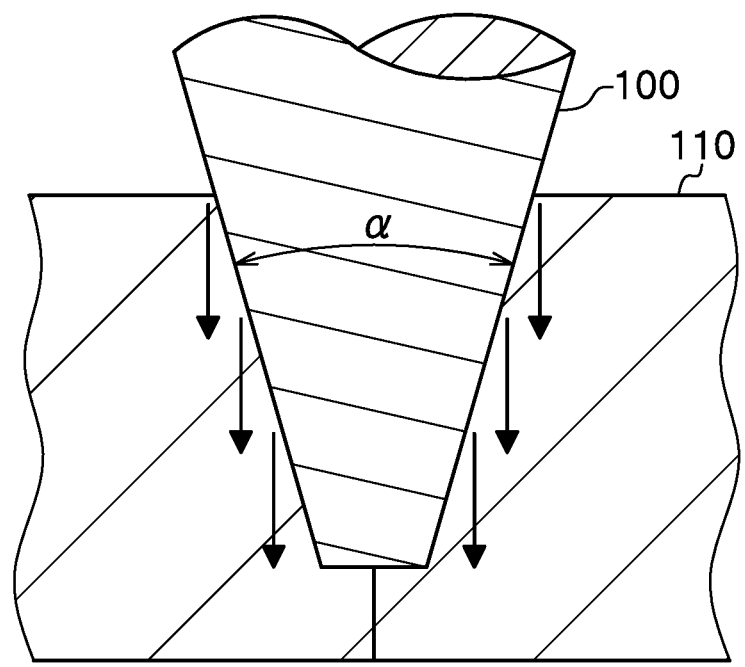
FIG. 18 is a conceptual view of a conventional rotary tool.
Figure 19:
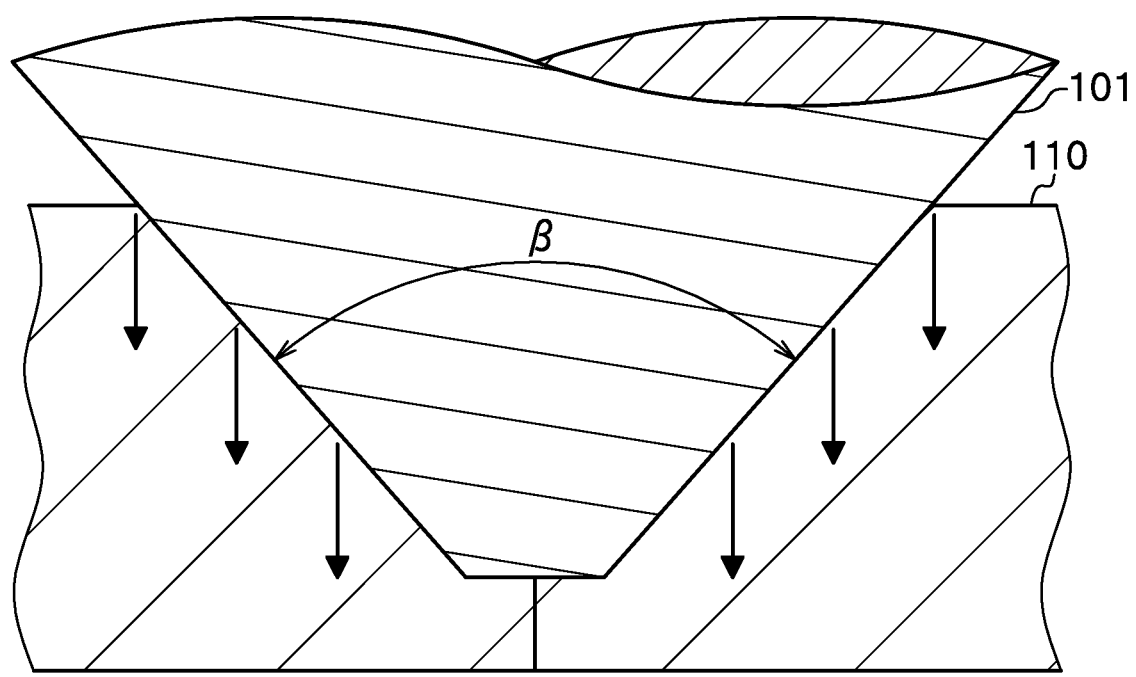
FIG. 19 is a conceptual view of the conventional rotary tool.

As illustrated in FIG. 18, a shoulder portion of a conventional primary joining rotary tool 100 does not press front surfaces of joined metal members 110 so that a recessed groove (a recessed groove defined by front surfaces of the joined metal members and a front surface of a plasticized region) is made large and a joined surface is made coarse. Further, bulged portions (portions, which are bulged compared with those before joining, of the front surfaces of the joined metal members) are formed on sides of the recessed groove. Meanwhile, as in a conventional primary joining rotary tool 101 as illustrated in FIG. 19, when a taper angle β of the primary joining rotary tool 101 is set to be larger than a taper angle α of the primary joining rotary tool 100, the primary joining rotary tool 101 presses the front surfaces of the joined metal members 110 more than the primary joining rotary tool 100 does, and the recessed groove is made small and the bulged portions also made small. However, downward plastic flow increases so that kissing bonds are likely to be generated in a lower portion of a plasticized region.

In contrast, according to the method for manufacturing a liquid cooling jacket of the present embodiment, the primary joining rotary tool F has a structure including the base end pin F2, and the distal end pin F3 which has a smaller taper angle than the taper angle A1 of the base end pin F2. This facilitates insertion of the primary joining rotary tool F into the jacket body 2 and the sealing body 3. Further, the taper angle A2 of the distal end pin F3 is small, to facilitate the insertion of the primary joining rotary tool F into a deep position in the jacket body 2 and the sealing body 3. Still further, the taper angle A2 of the distal end pin F3 is small so that the primary joining rotary tool F suppresses downward plastic flow more than the primary joining rotary tool 101. This structure prevents kissing bonds from being generated in lower portions of the plasticized regions W1 and W2. Meanwhile, the taper angle A1 of the base end pin F2 is large so that joining is stably performed, as compared with the conventional rotary tool, even if thicknesses of the jacket body 2 and the sealing body 3 and a height position for joining are changed.

Further, the plastically fluidized material is pressed by the outer peripheral surface of the base end pin F2 so that the recessed groove formed in the joined front surface is made small and the bulged portions to be formed on the sides of the recessed groove are not formed or are formed smaller. Furthermore, the pin stepped portion 30 in a stepped shape is shallow and has a wide exit angle so that the plastically fluidized material easily flows outside the pin stepped portion 30 while the plastically fluidized material is pressed by the stepped bottom surface 30a. Therefore, the plastically fluidized material is hardly adhered to the outer peripheral surface of the base end pin F2 even when the plastically fluidized material is pressed by the base end pin F2. Accordingly, the joined surface is made less coarse and joining quality is suitably stabilized.

Further, the sealing body 3 is supported by the columnar supports 12, and the sealing body 3 and the columnar supports 12 are joined by friction stir joining, to increase deformation resistance of the liquid cooling jacket 1. Still further, according to the present embodiment, the columnar supports 12 are arranged in the hollow portion of the liquid cooling jacket 1, to allow the heat transport fluid to come in contact with the outer peripheral surfaces of the columnar supports 12. Therefore, the heat transferred from the heating element H to the columnar supports 12 via the fitting members M is efficiently discharged. That is, heat leakage through the fitting members M, with which the heating element H is fixed to the liquid cooling jacket 1, is prevented. Yet further, the columnar supports 12, to which the heating element H is fixed, are arranged inside the jacket body 2 so that the liquid cooling jacket 1 is reduced in size.

Further, in the first primary joining step, the insertion depth of the primary joining rotary tool F is set such that the flat surface F4 of the distal end pin F3 comes in contact with both the peripheral wall portion 11 and the sealing body 3 and the distal end surface F6 of the protrusion F5 comes in contact with only the peripheral wall portion 11. Metal around the protrusion F5 is brought upward by the protrusion F5 and is pressed by the flat surface F4. Thus, a vicinity of the protrusion F5 is frictionally stirred reliably, and oxide films of the first abutted portion J1 and of the overlapped surface between the stepped bottom surface 14a and the rear surface 3b of the sealing body 3 are reliably shut off. Therefore, joining strength of the first abutted portion J1 is further increased.

Further, in the second primary joining step, the insertion depth of the primary joining rotary tool F is set such that the flat surface F4 of the distal end pin F3 comes in contact with both the columnar support 12 and the sealing body 3 and the distal end surface F6 of the protrusion F5 comes in contact with only the columnar support 12. Metal around the protrusion F5 is brought upward by the protrusion F5 and is pressed by the flat surface F4. Thus, a vicinity of the protrusion F5 is frictionally stirred reliably, and oxide films of the second abutted portion J2 and of the overlapped surface between the stepped bottom surface 17a and the rear surface 3b of the sealing body 3 are reliably shut off. Therefore, joining strength of the second abutted portion J2 is further increased.

Further, according to the method for manufacturing a liquid cooling jacket of the present embodiment, only the distal end pin F3 and the base end pin F2 are inserted in the jacket body 2 and the sealing body 3. Therefore, a load on the friction stirring apparatus is reduced more than a case in which a shoulder portion of a rotary tool is pressed, and the primary joining rotary tool F is operated more stably. Still further, the load on the friction stirring apparatus is reduced so that the first abutted portion J1 and the second abutted portion J2 located in a deep position are joined without a large load on the friction stirring apparatus.

Furthermore, according to the method for manufacturing a liquid cooling jacket of the present embodiment, the provisional joining step is performed prior to the first primary joining step, and therefore when the first and second primary joining steps are performed, the first abutted portion J1 and the second abutted portion J2 are each prevented from coming apart.

Further, in the present embodiment, the columnar supports 12 (columnar support end surfaces 16a) are exposed to the front surface 3a of the sealing body 3, to facilitate performing the hole-forming step to form the fixing holes X and the mounting step to mount the heating element H. Still further, the columnar supports 12 are directly brought in contact with the heating element H, to further improve cooling efficiency.

The method for manufacturing a liquid cooling jacket according to the first embodiment of the present invention is described above, but design can be appropriately modified in a range without departing from the scope of the present invention. In the present embodiment, the primary joining step is performed in the order of the first abutted portion J1 and the second abutted portions J2, but the second abutted portions J2 may be firstly joined by friction stirring. Further, in the first primary joining step and the second primary joining step, friction stir joining may be performed while the jacket body 2 and the sealing body 3 are cooled by a cooling medium caused to flow inside the jacket body 2. Thus, frictional heat is kept low so that deformation of the liquid cooling jacket 1 due to thermal contraction is reduced. Still further, according to the method, joining can be made while the jacket body 2 and the jacket body 3 themselves are cooled without separately using a cooling plate, a cooling device, or the like.

Further, a planar cross-sectional shape of the columnar support 12 is a circular shape, but may be an ellipse shape or another polygonal shape.

Further, in the first embodiment, provisional joining is performed with the provisional joining rotary tool G, but may be performed with the primary joining rotary tool F. Thus, replacing the rotary tools can be eliminated. Still further, the provisional joining step may be performed to at least either one of the first abutted portion J1 and the second abutted portion J2. Yet further, the provisional joining step may be performed by welding.

[First Modification]

Figure 20:
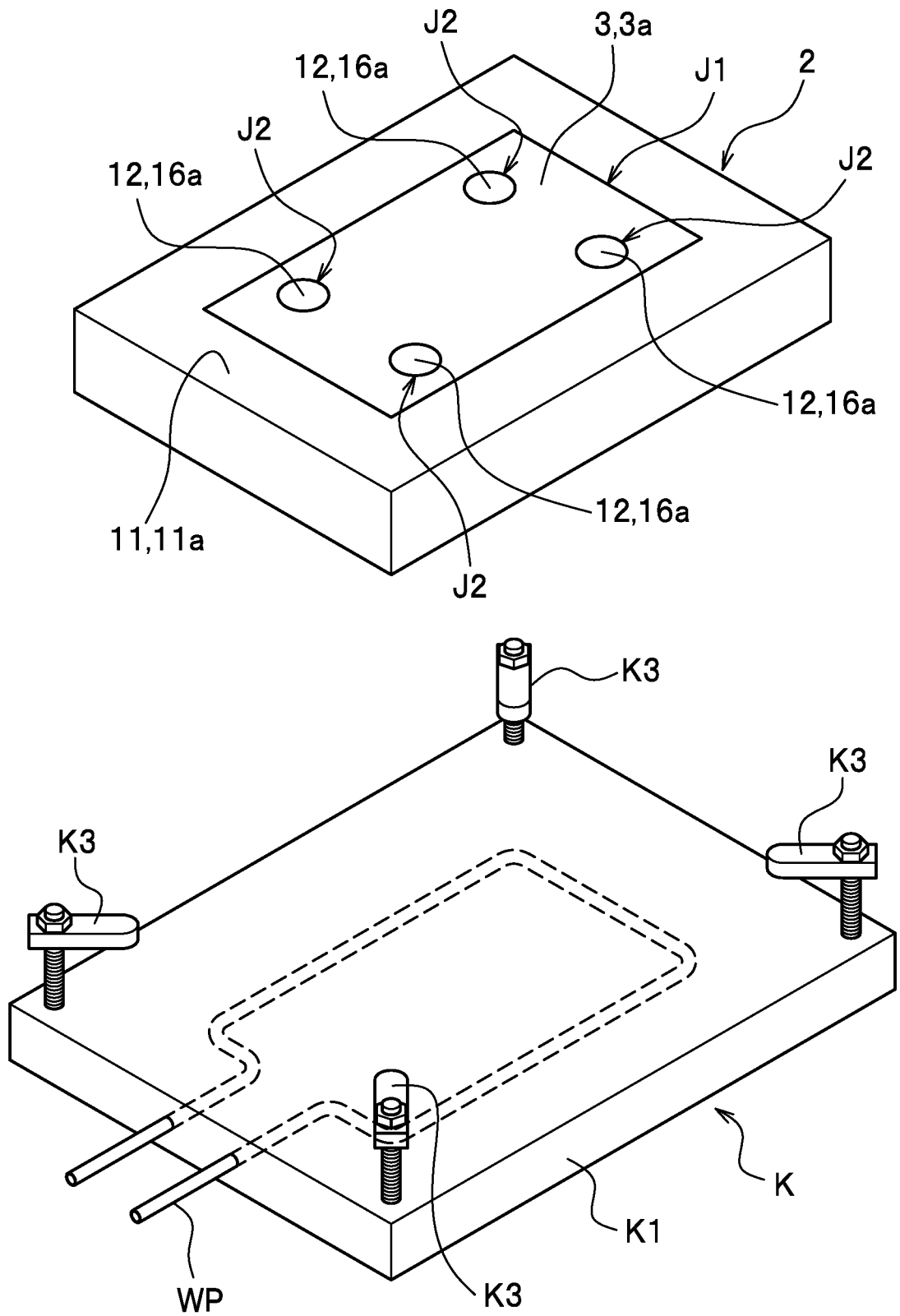
FIG. 20 is a perspective view of a liquid cooling jacket in a first modification of the method for manufacturing the same according to the first embodiment.

Next, a description is given of a method for manufacturing a liquid cooling jacket according to a first modification of the first embodiment. As illustrated in FIG. 20, the first modification differs from the first embodiment in that the provisional joining step, the first primary joining step, and the second primary joining step are performed with use of a cooling plate. The first modification is described with a focus on structures different from the first embodiment.

As illustrated in FIG. 20, in the first modification, the jacket body 2 is fixed to a table K at the time of performing the fixing step. The table K includes a substrate K1 having a rectangular parallelepiped shape, clamps K3 formed at four corners of the substrate K1, and a cooling pipe WP disposed within the substrate K1. The table K is a member which immovably fixes the jacket body 2 thereto and serves as a "cooling plate" set forth in claims.

The cooling pipe WP is a tubular member embedded inside the substrate K1. The cooling pipe WP is adapted to allow a cooling medium for cooling the substrate K1 to flow therein. A location of the cooling pipe WP, that is, the shape of a cooling flow path allowing the cooling medium to flow therein, is not particularly limited, but in the first modification, is of a planar shape which follows the moving trace of the primary joining rotary tool F in the first primary joining step. More specifically, the cooling pipe WP is disposed such that the cooling pipe WP and the first abutted portion J1 are approximately overlapped with each other in planar view.

In the provisional joining step, the first primary joining step, and the second primary joining step in the first modification, the jacket body 2 is first fixed to the table K and friction stir joining is then performed while allowing a cooling medium to flow in the cooling pipe WP. This allows frictional heat generated in the friction stirring to be suppressed low, thus deformation of the liquid cooling jacket 1 due to heat contraction is reduced. Further, in the first modification, since the cooling flow path is disposed to overlap with the first abutted portion J1 (the moving traces of the provisional joining rotary tool G and the primary joining rotary tool F) in planar view, a portion, in which the frictional heat is generated, is intensively cooled. This increases cooling efficiency. Still further, the cooling pipe WP is disposed to allow a cooling medium to flow therein, to facilitate control of the cooling medium. Yet further, since the table K (cooling plate) and the jacket body 2 are brought in surface-contact with each other, the cooling efficiency is further increased.

In addition to cooling of the jacket body 2 and the sealing body 3 with use of the table K (cooling plate), the friction stir joining may be performed while allowing a cooling medium to also flow within the jacket body 2.

[Second Modification]

Figure 21:
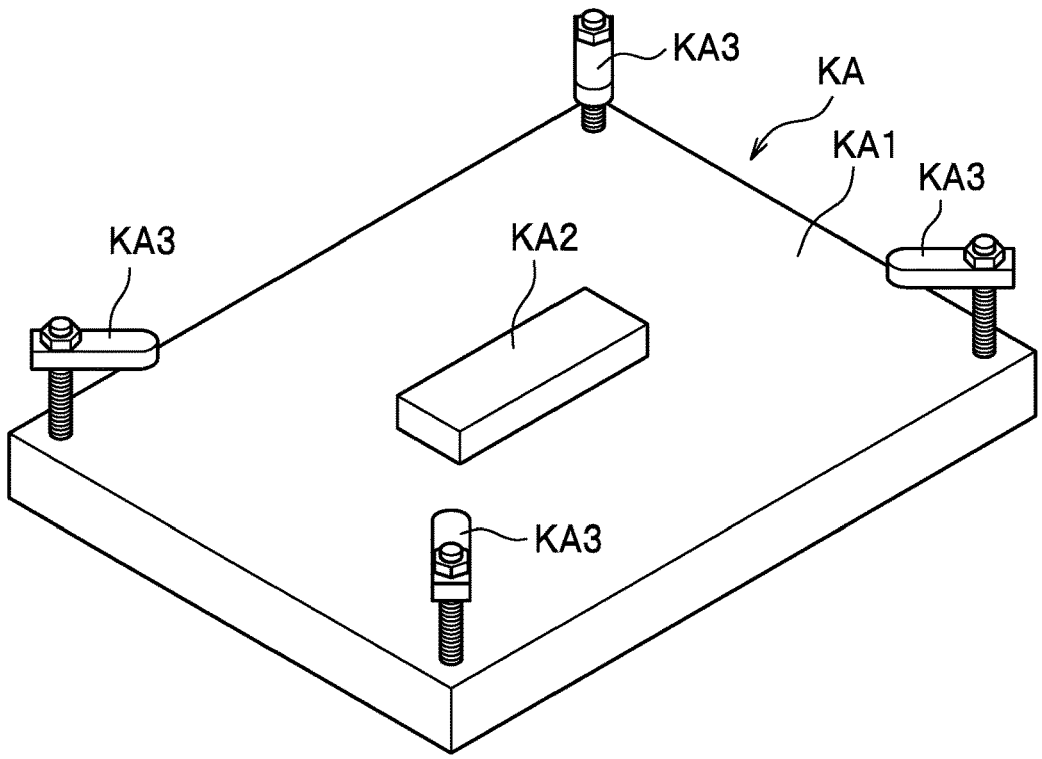
FIG. 21 is a perspective view of a table used in a second modification of the method for manufacturing a liquid cooling jacket according to the first embodiment.
Figure 22:
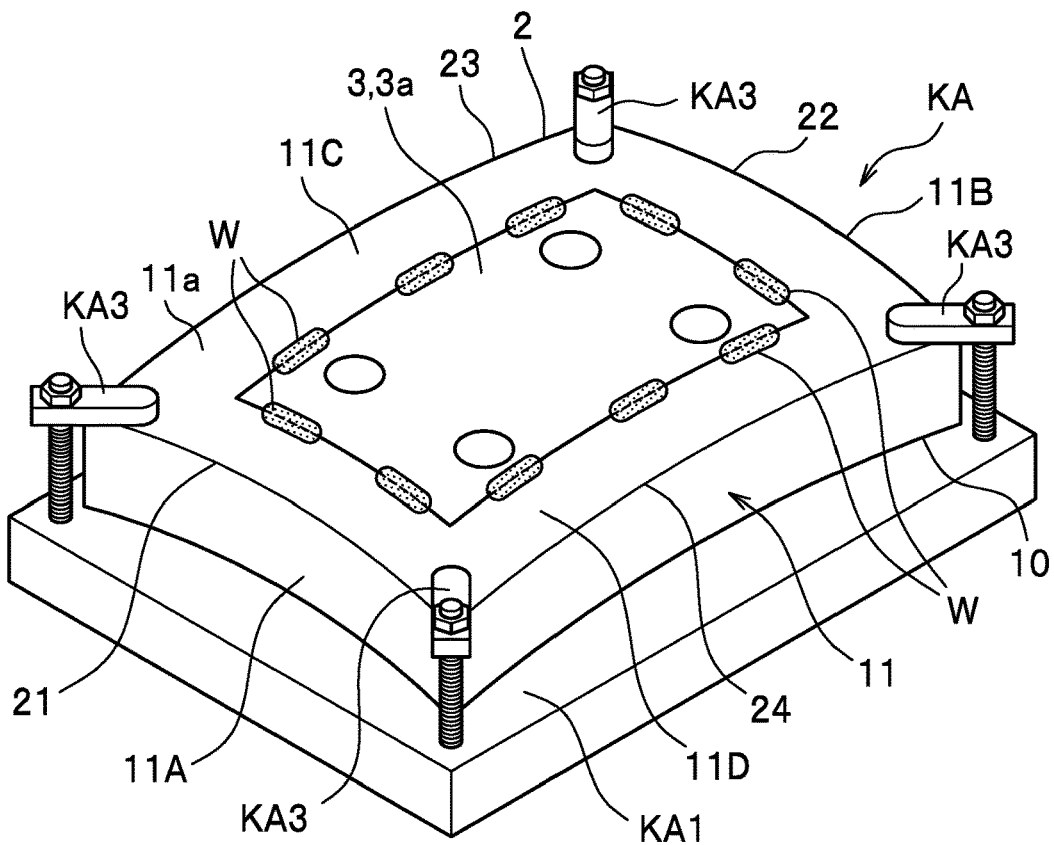
FIG. 22 is a perspective view of a jacket body and a sealing body being fixed to the table in the second modification of the method for manufacturing a liquid cooling jacket according to the first embodiment.

Next, a description is given of a method for manufacturing a liquid cooling jacket according to a second modification of the first embodiment. As illustrated in FIGS. 21 and 22, the second modification differs from the first embodiment in that the first primary joining step and the second primary joining step are performed in a state where a front surface of the jacket body 2 and a front surface 3a of the sealing body 3 are curved so as to have a convex shape. The second modification is described with a focus on structures different from the first embodiment.

As illustrated in FIG. 21, a table KA is employed in the second modification. The table KA includes a substrate KA1 having a rectangular parallelepiped shape, a spacer KA2 formed at the center of the substrate KA1, and clamps KA3 formed in four corners of the substrate KA1. The spacer KA2 may be formed integrally with or separately from the substrate KA1.

In the fixing step of the second modification, the jacket body 2 and the sealing body 3 integrated with each other through the provisional joining step are fixed to the table KA with the clamps KA3. As illustrated in FIG. 22, when fixed to the table KA, the jacket body 2 and the sealing body 3 are curved so as to have the bottom portion 10 and peripheral wall end surface 11a of the jacket body 2, and the front surface 3a of the sealing body 3 made to be convex upward. More specifically, the jacket body 2 is curved so as to have a first side portion 21 of the wall portion 11A, a second side portion 22 of the wall portion 11B, a third side portion 23 of the wall portion 11C, and a fourth side portion 24 of the wall portion 11D made to be curved lines.

In the first and second primary joining steps of the second modification, friction stir joining is performed with the primary joining rotary tool F. In the first and second primary joining steps, an amount of deformation of at least one of the jacket body 2 and the sealing body 3 is measured in advance and friction stir joining is then performed while the insertion depth of the distal end pin F3 of the primary joining rotary tool F is adjusted in accordance with the amount of deformation. That is, the primary joining rotary tool F is moved so as to have the moving trace thereof made to be a curved line along the curved surfaces of the peripheral wall end surface 11a of the jacket body 2 and the front surface 3a of the sealing body 3. This makes the depth and width of the plasticized regions W1 and W2 constant.

There is a risk that heat input due to friction stir joining causes heat contraction to be generated in the plasticized regions W1 and W2 to have the sealing body 3 of the liquid cooling jacket 1 deformed into a concave shape. However, according to the first and second primary joining steps of the second modification, since the jacket body 2 and the sealing body 3 are held in a convex shape in advance so that a tensile stress acts on the peripheral wall end surface 11a and the front surface 3a, the liquid cooling jacket 1 becomes flat by making use of heat contraction after friction stir joining. Further, in a case where the primary joining step is performed with the conventional rotary tool, when the jacket body 2 and the sealing body 3 are curved in a convex shape, the shoulder portion of the rotary tool comes in contact with the jacket body 2 and the sealing body 3 and thus the rotary tool is not suitably operated. However, according to the second modification, since the primary joining rotary tool F has no shoulder portion, the primary joining rotary tool F is suitably operated even when the jacket body 2 and the sealing body 3 are curved in a convex shape.

The amount of deformation of the jacket body 2 and the sealing body 3 may be measured with use of a known height detecting device. Further, for example, a friction stirring apparatus, which is equipped with a detecting device to detect a height from the table KA to at least one of the jacket body 2 and the sealing body 3, may be used. The first and second primary joining steps may be performed while the amount of deformation of the jacket body 2 or the sealing body 3 is detected.

Further, although the jacket body 2 and the sealing body 3 are curved so as to have all of the first to fourth side portions 21 to 24 made to be curved lines in the second modification, the shape of curves is not limited thereto. For example, the jacket body 2 and the sealing body 3 may be curved so as to have the first side portion 21 and the second side portion 22 made to be straight lines and the third side portion 23 and the fourth side portion 24 made to be curved lines. Still further, for example, the jacket body 2 and the sealing body 3 may be curved so as to have the first side portion 21 and the second side portion 22 made to be curved lines and the third side portion 23 and the fourth side portion 24 made to be straight lines.

Further, in the second modification, although the height position of the distal end pin F3 of the primary joining rotary tool F is changed in accordance with the amount of deformation of the jacket body 2 or the sealing body 3, the primary joining step may be performed with the height of the distal end pin F3 of the primary joining rotary tool F relative to the table KA being kept constant.

Further, the spacer KA2 may have any shape as long as the jacket body 2 and the sealing body 3 can be fixed so as to have the front surfaces thereof made to be convex. Still further, the spacer KA2 may be omitted as long as the jacket body 2 and the sealing body 3 can be fixed so as to have the front surfaces thereof made to be convex. Yet further, the primary joining rotary tool F may be attached to, for example, a robot arm including a spindle unit at a head thereof. According to the structure, the rotation axes of the primary joining rotary tool F is easily inclined at various angles.

[Third Modification]

Figure 23:
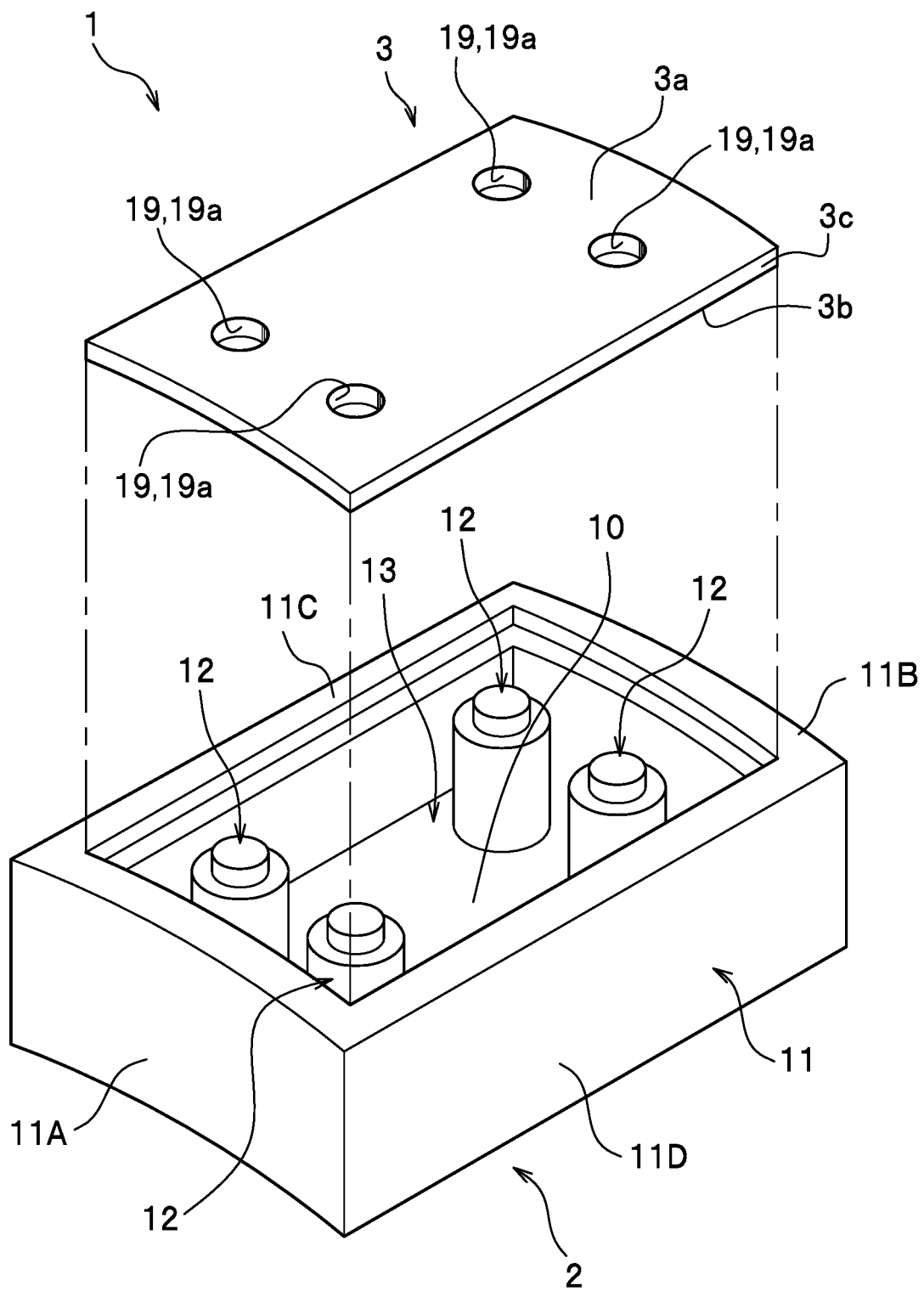
FIG. 23 is an exploded perspective view of a liquid cooling jacket in a third modification of the method for manufacturing the same according to the first embodiment.

Next, a description is given of a method for manufacturing a liquid cooling jacket according to a third modification of the first embodiment. As illustrated in FIG. 23, the third modification differs from the first embodiment in that the jacket body 2 and the sealing body 3 are formed in advance so as to be curved in a convex shape toward the front surface side in the preparing step. The third modification is described with a focus on structures different from the first embodiment.

In the preparing step according to the third modification, the jacket body 2 and the sealing body 3 are formed by die-casting so as to have the front surfaces thereof to be curved into a convex shape. The jacket body 2 is formed such that the bottom portion 10 and the peripheral wall portion 11 are formed in a convex shape toward the front surface, respectively. Further, the sealing body 3 is formed to have the front surface 3a thereof in a convex shape.

Figure 24:
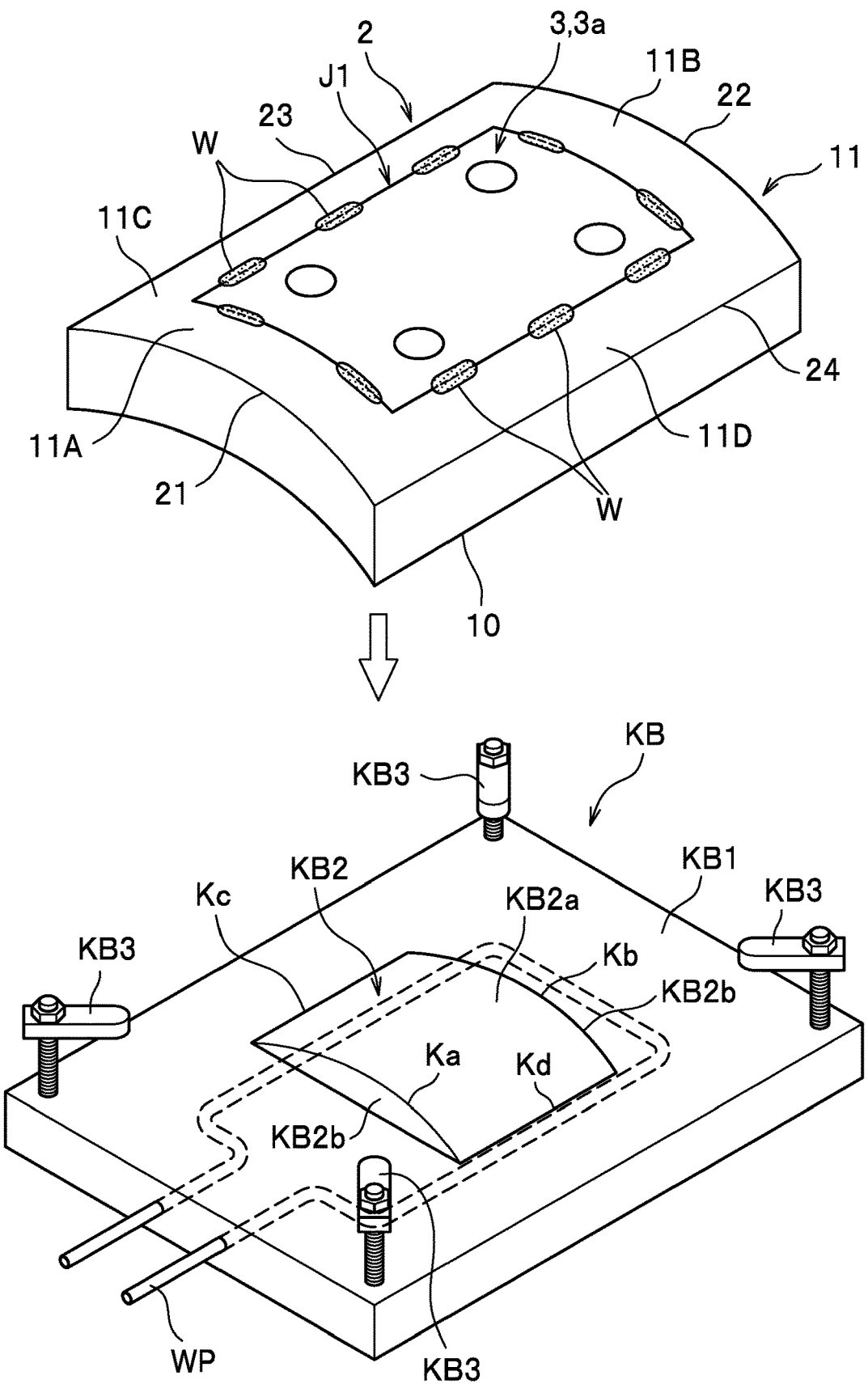
FIG. 24 is a perspective view of a jacket body and a sealing body being fixed to the table in the third modification of the method for manufacturing a liquid cooling jacket according to the first embodiment.

As illustrated in FIG. 24, in the third modification, the jacket body 2 and the sealing body 3 provisionally joined together are fixed to a table KB at the time of performing the fixing step. The table KB includes a substrate KB1 in a rectangular parallelepiped shape, a spacer KB2 disposed at the center of the substrate KB1, clamps KB3 formed at four corners of the substrate KB1, and a cooling pipe WP embedded inside the substrate KB1. The table KB is a member which immovably fixes the jacket body 2 thereto and serves as a "cooling plate" set forth in claims.

The spacer KB2 includes a curved surface KB2a curved to have an upwardly convex shape, and upright surfaces KB2b, KB2b formed at both ends of the curved surface KB2a and rising from the substrate KB1. The spacer KB2 has a first side portion Ka and a second side portion Kb made to be curved lines, and a third side portion Kc and a fourth side portion Kd made to be straight lines.

The cooling pipe WP is a tubular member embedded inside the substrate KB1. The cooling pipe WP is adapted to allow a cooling medium for cooling the substrate KB1 to flow therein. A location of the cooling pipe WP, that is, a shape of a cooling flow path allowing the cooling medium to flow therein, is not particularly limited, but in the third modification, is of a planar shape to follow the moving trace of the primary joining rotary tool F in the first primary joining step. More specifically, the cooling pipe WP is disposed such that the cooling pipe WP and the first abutted portion J1 are approximately overlapped with each other in planar view.

In the fixing step of the third modification, the jacket body 2 and the sealing body 3 integrated with each other through the provisional joining step are fixed to the table KB with the clamps KB3. More specifically, the jacket body 2 and the sealing body 3 are fixed to the table KB such that the rear surface of the bottom portion 10 of the jacket body 2 comes in surface-contact with the curved surface KB2a. When the jacket body 2 is fixed to the table KB, the jacket body 2 is curved such that the first side portion 21 of the wall portion 11A thereof and the second side portion 22 of the wall portion 11B thereof are made to be curved lines, and the third side portion 23 of the wall portion 11C thereof and the fourth side portion 24 of the wall portion 11D thereof are made to be straight lines.

In the first and second primary joining steps of the third modification, friction stir joining is performed for the first abutted portion J1 and the second abutted portion J2, respectively, with the primary joining rotary tool F. In the first and second primary joining steps, the amount of deformation of at least one of the jacket body 2 and the sealing body 3 is measured in advance and the friction stir joining is then performed while the insertion depth of the distal end pin F3 of the primary joining rotary tool F is adjusted in accordance with the amount of deformation. That is, the primary joining rotary tool F is moved so as to have the moving trace thereof made to be a curved line or a straight line along the peripheral wall end surface 11a of the jacket body 2 and the front surface 3a of the sealing body 3. This makes the depth and width of the plasticized region W1 constant.

There is a risk that heat input due to friction stir joining causes heat contraction to be generated in the plasticized regions W1 and W2 to have the sealing body 3 of the liquid cooling jacket 1 deformed into a concave shape. However, according to the first and second primary joining steps of the third modification, since the jacket body 2 and the sealing body 3 are formed in a convex shape in advance, the liquid cooling jacket 1 becomes flat by making use of heat contraction after friction stir joining.

Further, in the third modification, the curved surface KB2a of the spacer KB2 is made to come in surface-contact with the rear surface in a concave shape of the bottom portion 10 of the jacket body 2. With the structure, friction stir joining is performed while the jacket body 2 and the sealing body 3 are cooled more effectively. Since the frictional heat generated in the friction stir joining is suppressed low, deformation of the liquid cooling jacket 1 due to heat contraction is reduced. This allows the jacket body 2 and the sealing body 3 to have a reduced curvature when the jacket body 2 and the sealing body 3 are formed into a convex shape in the preparing step.

The amount of deformation of the jacket body 2 and the sealing body 3 may be measured with use of a known height detecting device. Further, for example, a friction stirring apparatus, which is equipped with a detecting device to detect a height from the table KB to at least one of the jacket body 2 and the sealing body 3, may be used. The primary joining step may be performed while the amount of deformation of the jacket body 2 or the sealing body 3 is detected.

Further, although the jacket body 2 and the sealing body 3 are curved so as to have the first side portion 21 and the second side portion 22 made to be curved lines in the third modification, the shape of curves is not limited thereto. For example, the spacer KB2 having a spherical surface may be formed so that the rear surface of the bottom portion 10 of the jacket body 2 is made to come in surface-contact with the spherical surface. In this case, when the jacket body 2 is fixed to the table KB, all of the first to fourth side portions 21 to 24 are made to be curved lines.

Further, in the third modification, although the height position of the distal end pin F3 of the primary joining rotary tool F is changed in accordance with the amount of deformation of the jacket body 2 or the sealing body 3, the primary joining step may be performed with the height of the distal end pin F3 of the primary joining rotary tool F relative to the table KB being kept constant.

Second Embodiment

Figure 25:
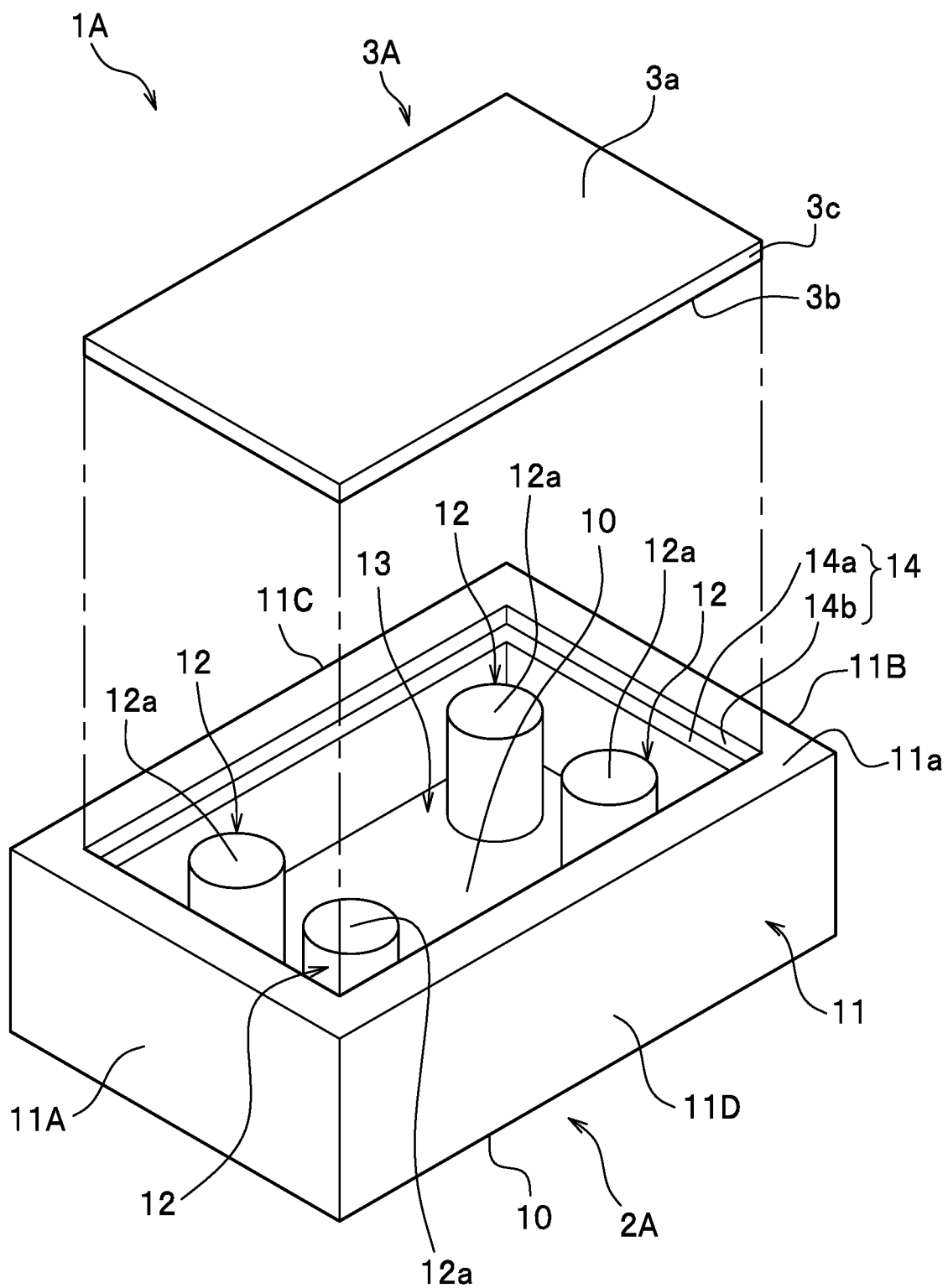
FIG. 25 is an exploded perspective view of a liquid cooling jacket according to a second embodiment.

Next, a description is given of a method for manufacturing a liquid cooling jacket according to a second embodiment of the present invention. As illustrated in FIG. 25, the second embodiment differs from the first embodiment in that a columnar support 12 does not have a columnar support stepped portion thereon. The method for manufacturing a liquid cooling jacket according to the second embodiment is described with a focus on structures different from the first embodiment.

A liquid cooling jacket 1A according to the second embodiment includes a jacket body 2A and a sealing body 3A. The jacket body 2A is a box-shaped body whose top is open. The jacket body 2A includes a bottom portion 10, a peripheral wall portion 11, and a plurality of columnar supports 12. A material of the jacket body 2A is appropriately selected from frictionally stirrable metal such as aluminum, an aluminum alloy, copper, a copper alloy, titanium, a titanium alloy, magnesium, and a magnesium alloy. In the present embodiment, the jacket body 2A is made of an aluminum alloy which is the same material as the sealing body 3A, but an aluminum alloy casting material (such as JIS AC4C, ADC12) may be used. The bottom portion 10 has a rectangular shape in planar view. The peripheral wall portion 11 includes wall portions 11A, 11B, 11C, and 11D, each having the same plate thickness.

A peripheral wall stepped portion 14 is formed at the peripheral wall end surface 11a of the peripheral wall portion 11 along a peripheral edge of the opening of the jacket body 2A. The peripheral wall stepped portion 14 includes a stepped bottom surface 14a and a stepped side surface 14b rising from the stepped bottom surface 14a. The stepped bottom surface 14a is formed at a position one step lower than the peripheral wall end surface 11a.

The columnar supports 12 are provided to stand on the bottom portion 10 and have a columnar shape. The number of the columnar supports 12 is not limited as long as one or more columnar supports are arranged, and four columnar supports are arranged in the present embodiment. The columnar supports 12 each have the same shape. A columnar support end surface 12a as an end surface of the columnar support 12 is formed to have the same height as the stepped bottom surface 14a of the peripheral wall stepped portion 14.

The sealing body 3A is a plate-shaped member having a rectangular shape in planar view. In the present embodiment, the sealing body 3A is made of an aluminum alloy which is the same material as that of the jacket body 2A, but an aluminum wrought alloy material (such as JIS A1050, A1100, and A6063) may be used. The sealing body 3A is formed to have a size to be placed on the peripheral wall stepped portion 14 without any gap. The sealing body 3A has approximately the same thickness as the height of the stepped side surface 14b.

Figure 26:
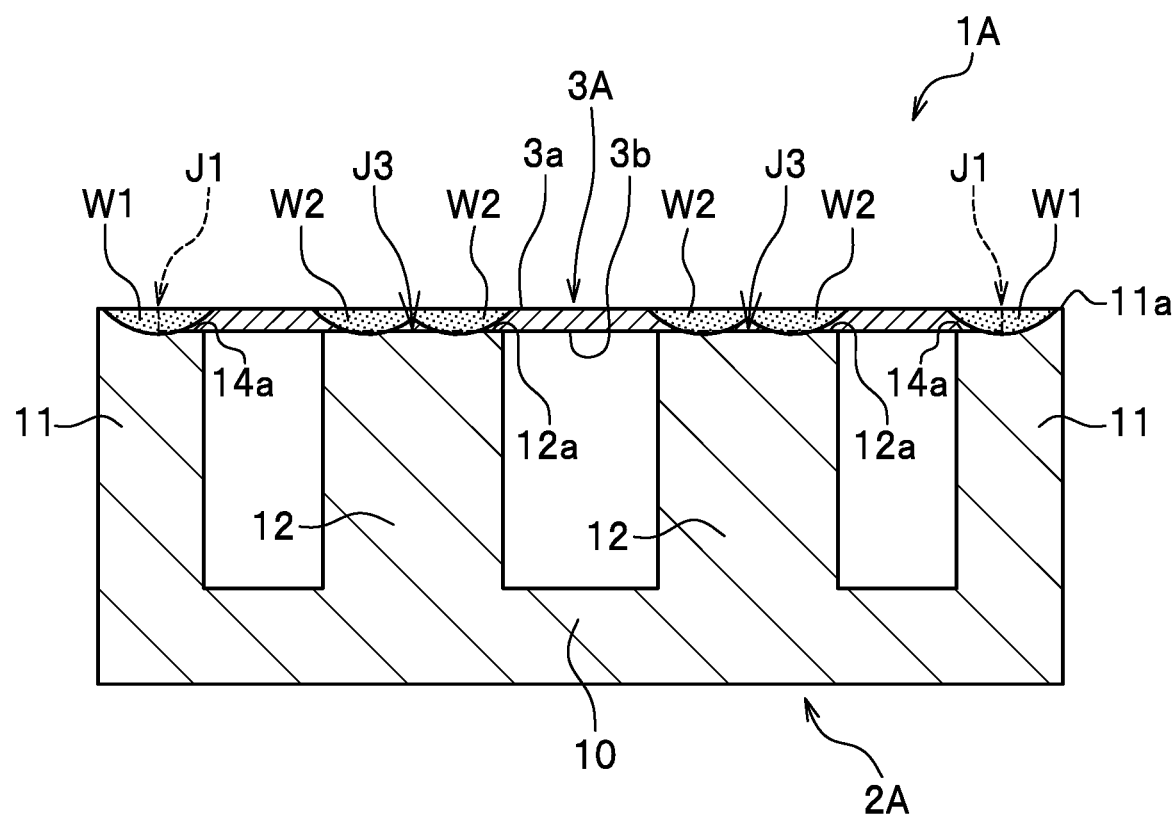
FIG. 26 is a cross-sectional view of the liquid cooling jacket according to the second embodiment.

As illustrated in FIG. 26, the liquid cooling jacket 1A is formed of the jacket body 2A and the sealing body 3A being integrally joined together by friction stirring. The liquid cooling jacket 1A is joined by friction stirring, respectively, at the first abutted portion J1 where the stepped side surface 14b (see FIG. 25) of the peripheral wall stepped portion 14 is abutted with the outer peripheral side surface 3c of the sealing body 3A and at four overlapped portions J3 where the rear surface 3b of the sealing body 3A are overlapped with the columnar support end surfaces 12a of the columnar supports 12. The plasticized region W1 is formed at the first abutted portion J1, and the plasticized regions W2 are formed at the overlapped portions J3. The liquid cooling jacket 1A has a hollow portion formed therein, in which heat transport fluid flows for transporting heat outside.

Next, a description is given of a method for manufacturing a liquid cooling jacket (a method for manufacturing a liquid cooling jacket having a heating element) according to the second embodiment. The method for manufacturing a liquid cooling jacket includes a preparing step, a placing step, a fixing step, a provisional joining step, a first primary joining step, a second primary joining step, a hole-forming step, a burr removing step, and a mounting step.

As illustrated in FIG. 25, the preparing step is a step of forming the jacket body 2A and the sealing body 3A. The jacket body 2A is formed by die-casting, for example.

Figure 27:
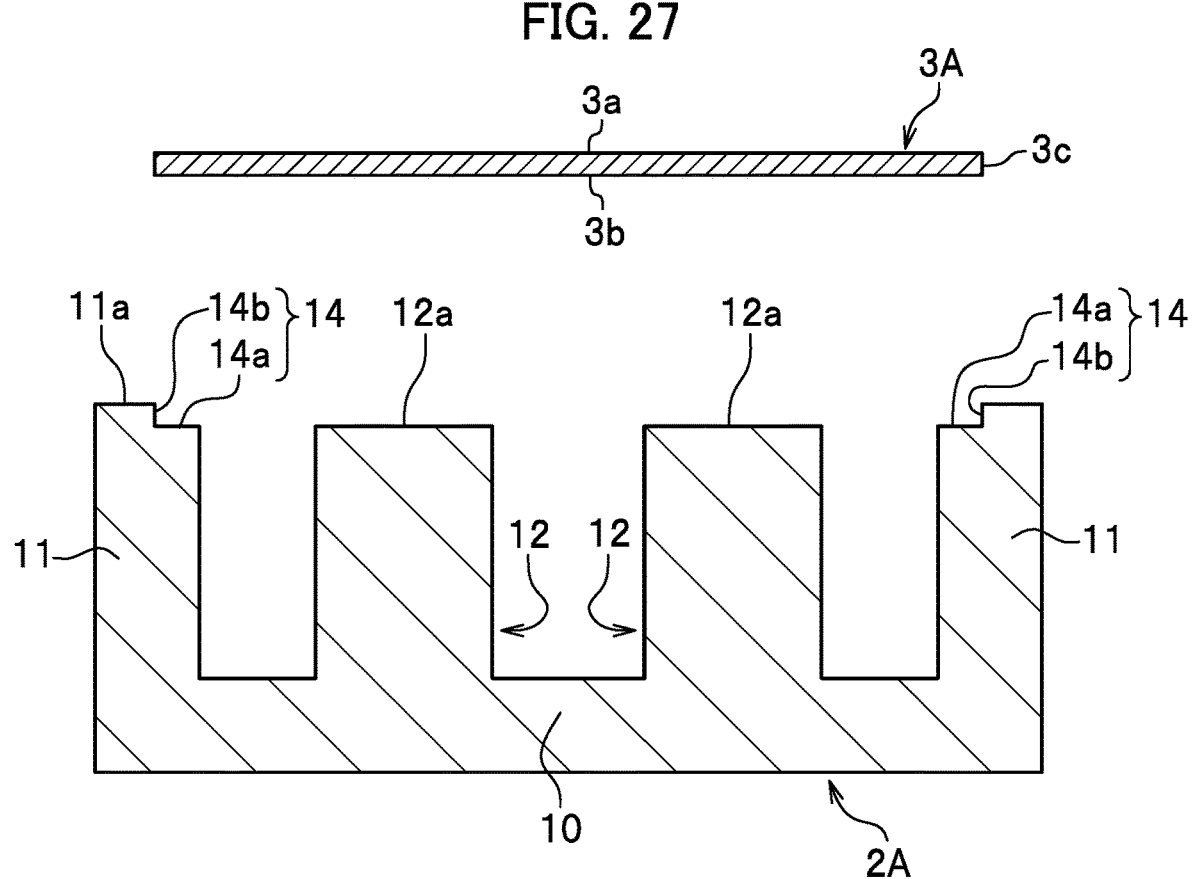
FIG. 27 is a cross-sectional view of the liquid cooling jacket before a placing step of a method for manufacturing the same according to the second embodiment.
Figure 28:
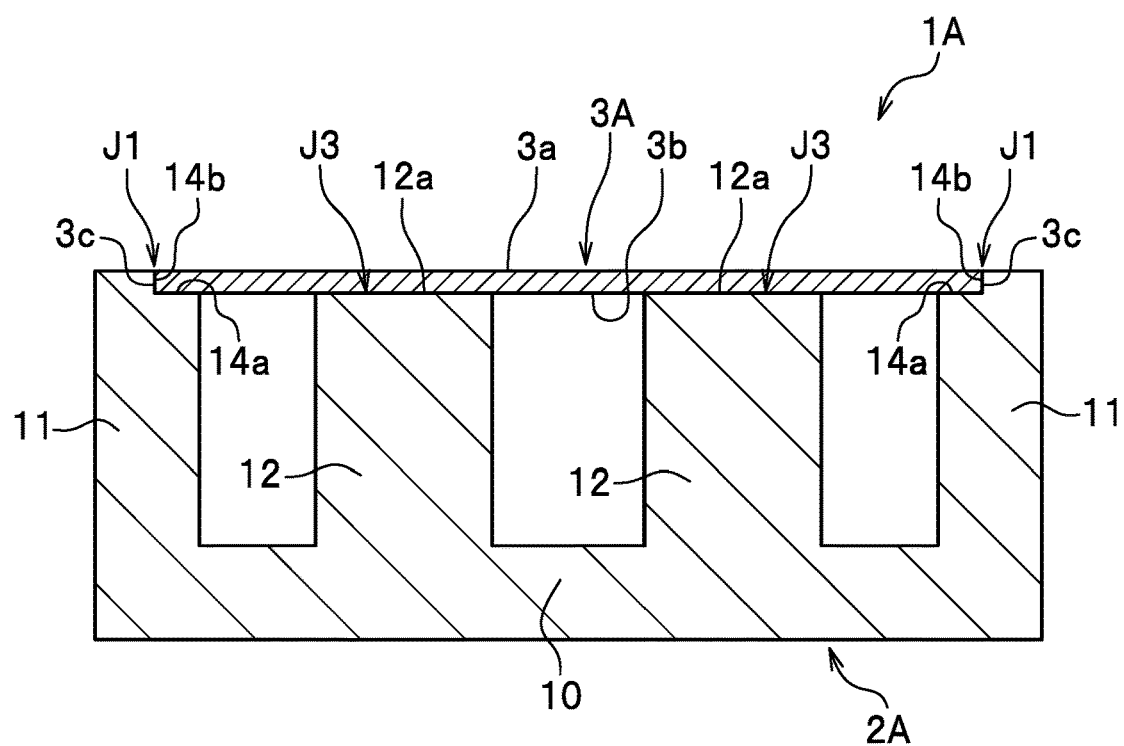
FIG. 28 is a cross-sectional view of the liquid cooling jacket after the placing step of the method for manufacturing the same according to the second embodiment.

As illustrated in FIGS. 27 and 28, the placing step is a step of placing the sealing body 3A in the jacket body 2A. The rear surface 3b of the sealing body 3A is brought in surface-contact with the stepped bottom surface 14a of the peripheral wall stepped portion 14 and the columnar support end surfaces 12a of the columnar supports 12, respectively. The placing step makes the stepped side surface 14b of the peripheral wall stepped portion 14 abutted with the outer peripheral side surface 3c of the sealing body 3A to form the first abutted portion J1. The first abutted portion J1 has a rectangular shape in planar view. Further, the placing step makes the rear surface 3b of the sealing body 3A overlapped with the columnar support end surfaces 12a of the columnar supports 12 to form the overlapped portions J3. The overlapped portion J3 has a circular shape in planar view.

In the fixing step, the jacket body 2A is fixed to a table (not shown). The jacket body 2A is immovably fixed to the table with fixing jigs such as clamps.

Figure 29:
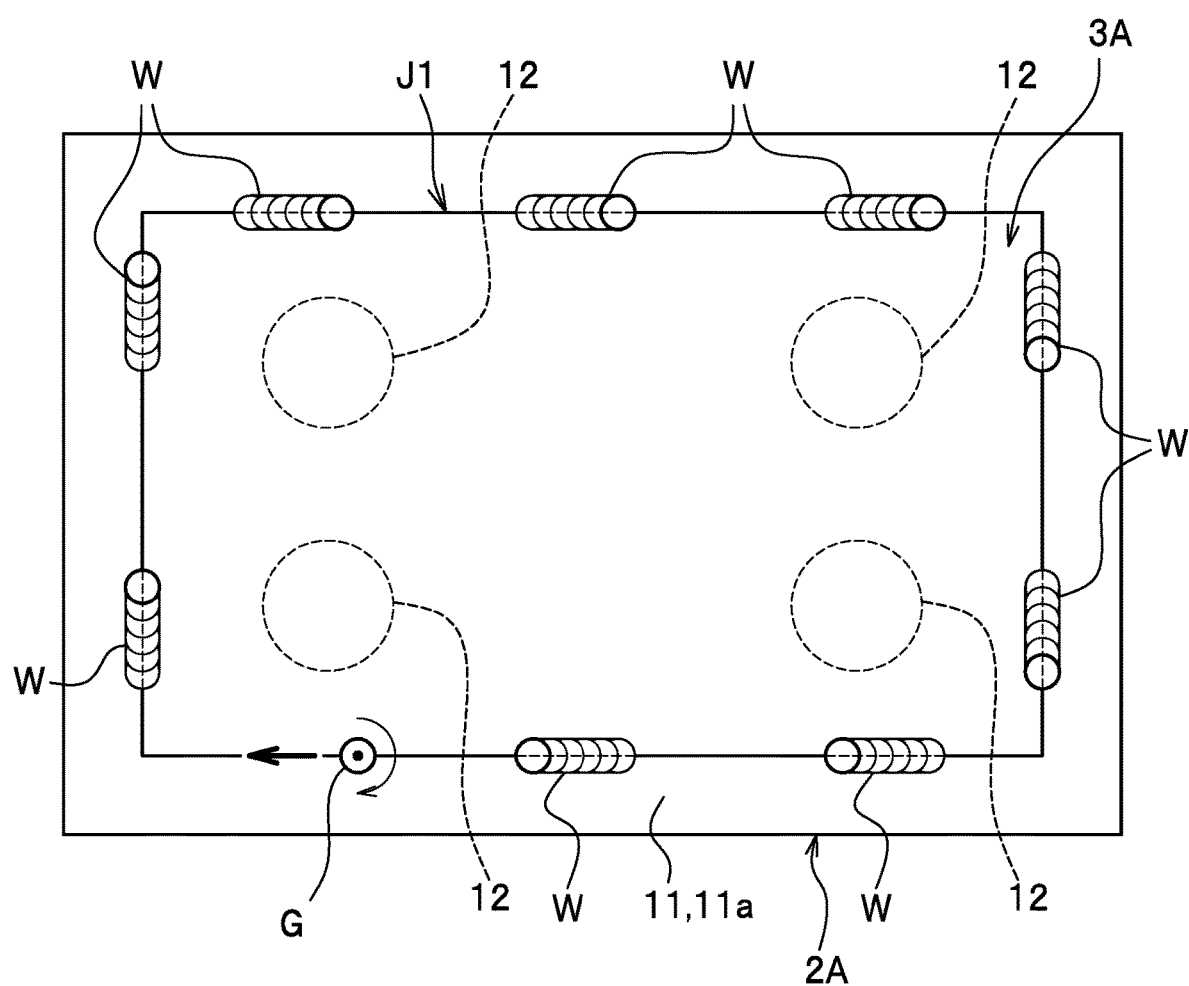
FIG. 29 is a plan view of the liquid cooling jacket in a provisional joining step of the method for manufacturing the same according to the second embodiment.

As illustrated in FIG. 29, the provisional joining step is a step of provisionally joining the jacket body 2A to the sealing body 3A. The provisional joining step is the same as that in the first embodiment, and thus a description thereof is omitted.

Figure 30:
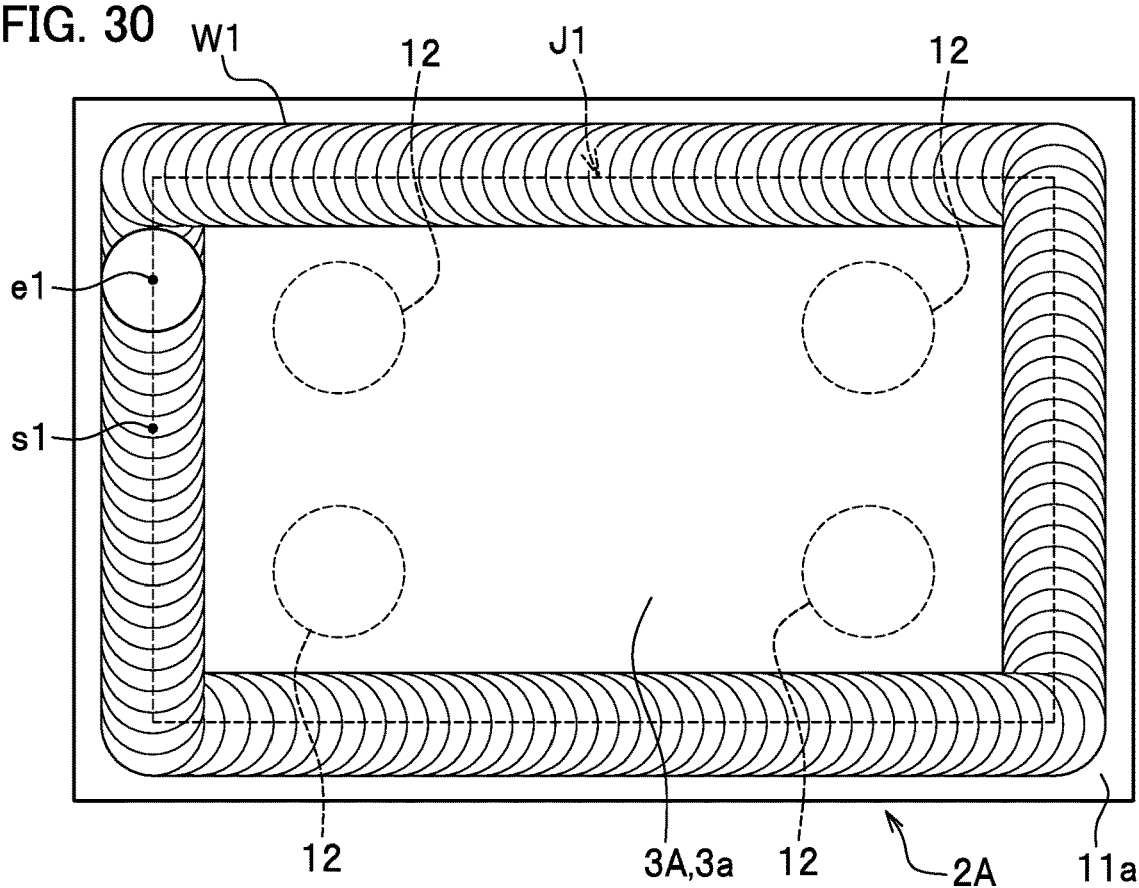
FIG. 30 is a plan view of the liquid cooling jacket in a first primary joining step of the method for manufacturing the same according to the second embodiment.
Figure 31:
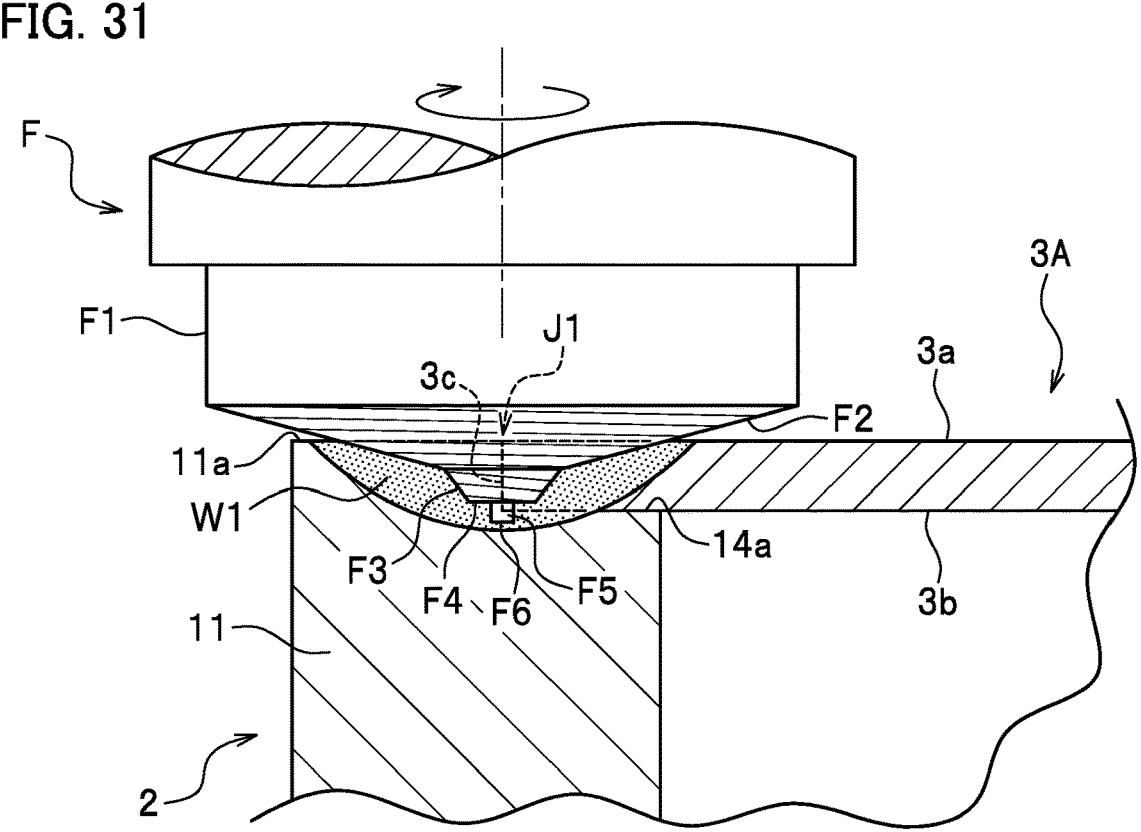
FIG. 31 is a cross-sectional view of the liquid cooling jacket in the first primary joining step of the method for manufacturing the same according to the second embodiment shown in FIG. 30.

As illustrated in FIGS. 30 and 31, the first primary joining step is a step of performing friction stir joining to the first abutted portion J1 with the primary joining rotary tool F. The first primary joining step is the same as that in the first embodiment, and thus a description thereof is omitted.

Figure 32:
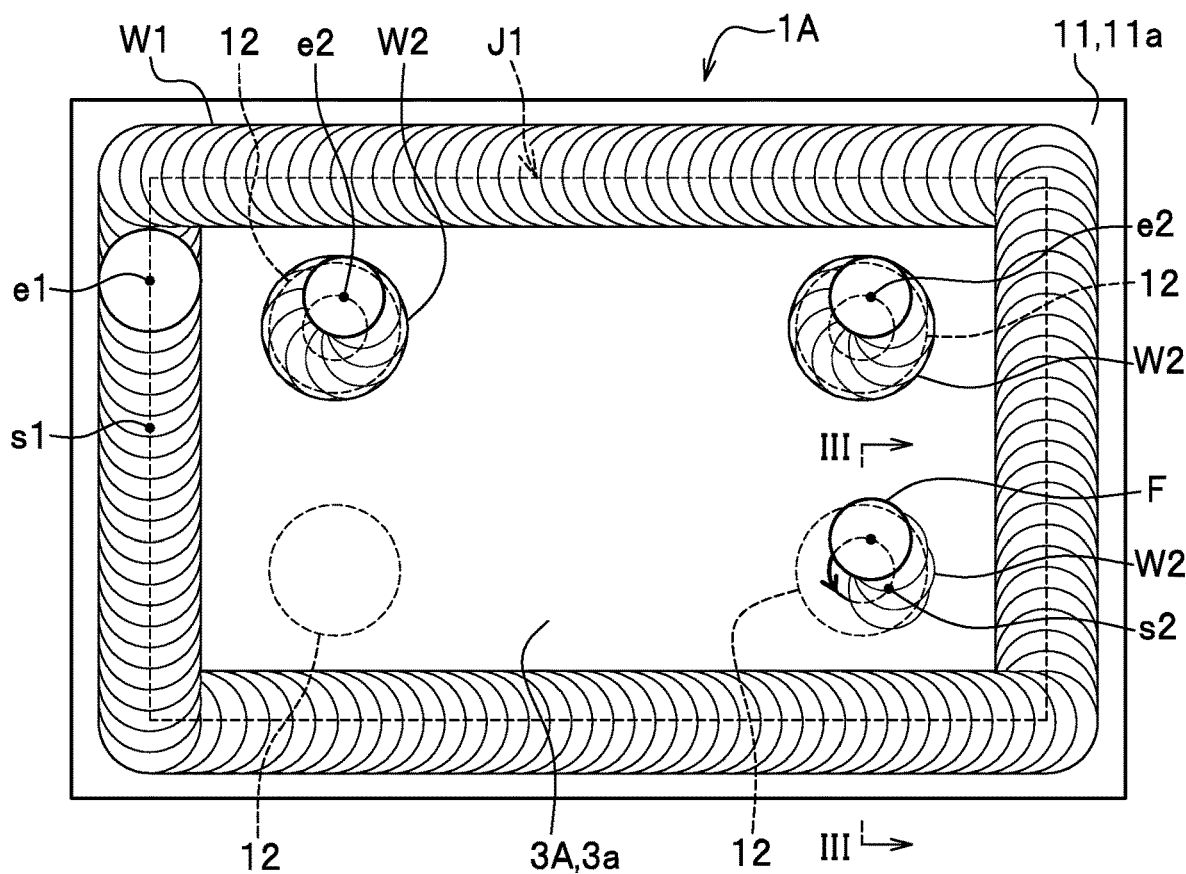
FIG. 32 is a plan view of the liquid cooling jacket in a second primary joining step of the method for manufacturing the same according to the second embodiment.
Figure 33:
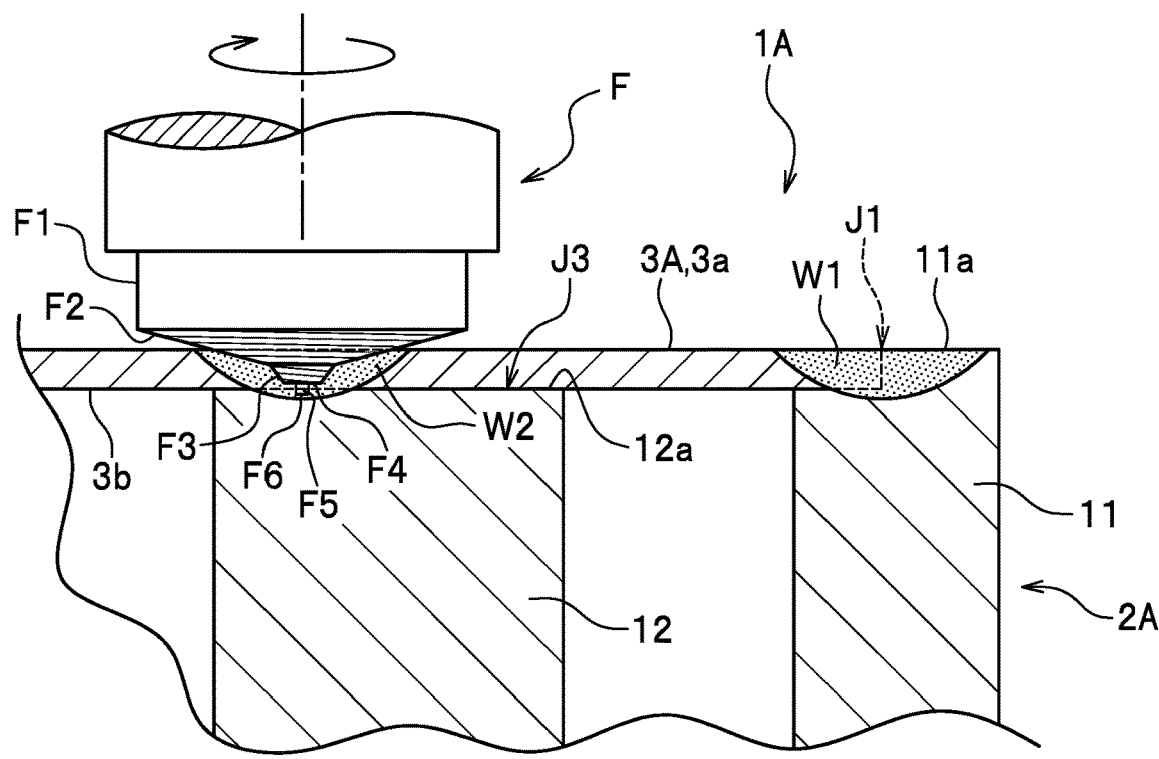
FIG. 33 is a cross-sectional view, taken along a line III-III in FIG. 32, of the liquid cooling jacket in the second primary joining step of the method for manufacturing the same according to the second embodiment.

As illustrated in FIGS. 32 and 33, the second primary joining step is a step of performing friction stir joining to the respective overlapped portions J3 with the primary joining rotary tool F. In the second primary joining step, the primary joining rotary tool F rotated clockwise is inserted from the front surface 3a of the sealing body 3A into the start position s2. Then, the primary joining rotary tool F is relatively moved counterclockwise in the outer peripheral edge of the columnar support 12. The plasticized regions W2 are formed in the overlapped portions J3 through the second primary joining step.

As illustrated in FIG. 33, in the second primary joining step, friction stir joining is performed in a state where the sealing body 3A is brought in contact with the distal end pin F3 and the sealing body 3A is brought in contact with the base end pin F2. In the second primary joining step, friction stir joining is performed while the front surface 3a of the sealing body 3A is pressed by the outer peripheral surface of the base end pin F2 of the primary joining rotary tool F. Further, the insertion depth of the primary joining rotary tool F is set such that the flat surface F4 of the distal end pin F3 comes in contact with only the sealing body 3 and the distal end surface F6 of the protrusion F5 comes in contact with the columnar support 12. Metal around the protrusion F5 is brought upward by the protrusion F5 and is pressed by the flat surface F4. Thus, a vicinity of the protrusion F5 is frictionally stirred reliably, and an oxide film of the overlapped portion J3 is reliably shut off. Therefore, joining strength of the overlapped portion J3 is further increased.

The insertion depth of the primary joining rotary tool F is not necessarily constant. The insertion depth may be changed between the first primary joining step and the second primary joining step, for example.

In the second primary joining step, when the primary joining rotary tool F is moved counterclockwise with respect to the columnar support 12 as in the present embodiment, the primary joining rotary tool F is preferably rotated clockwise. Meanwhile, when the primary joining rotary tool F is moved clockwise with respect to the columnar support 12, the primary joining rotary tool F is preferably rotated counterclockwise. By setting the traveling direction and rotating direction of the primary joining rotary tool F as described above, even if joint defects are generated due to friction stir joining, the defects are generated on the columnar support 12 side having a relatively large thickness which is far away from the hollow portion of the liquid cooling jacket 1A so that the degradation in watertightness and airtightness is reduced.

As illustrated in FIG. 32, the primary joining rotary tool F is moved around by one lap in the overlapped portion J3 and then continuously moved to pass through a start position s2. Then, the primary joining rotary tool F is moved to an end position e2 set on the sealing body 3A, and when reaching the end position e2, the primary joining rotary tool F is moved upward so as to be pulled out of the sealing body 3A.

If a pulled-out mark remains in the sealing body 3A after the primary joining rotary tool F is pulled out of the overlapped portion J3, a repairing step of repairing the pulled-out mark may be performed. In the repairing step, the pulled-out mark is repaired by build-up welding to fill welded metal in the pulled-out mark, for example. Thus, the front surface 3a of the sealing body 3A is flattened.

When the primary joining rotary tool F is pulled out of the sealing body 3A, the primary joining rotary tool F may be shifted toward the center of the columnar support 12 and then pulled out of the sealing body 3A. Further, when the primary joining rotary tool F is pulled out of the sealing body 3A, the primary joining rotary tool F may gradually be moved upward while the primary joining rotary tool F is moved on the sealing body 3A, for example, so that the insertion depth of the primary joining rotary tool F is gradually shallower. Thus, a pulled-out mark after the second primary joining step does not remain or is made smaller on the sealing body 3A.

Figure 34:
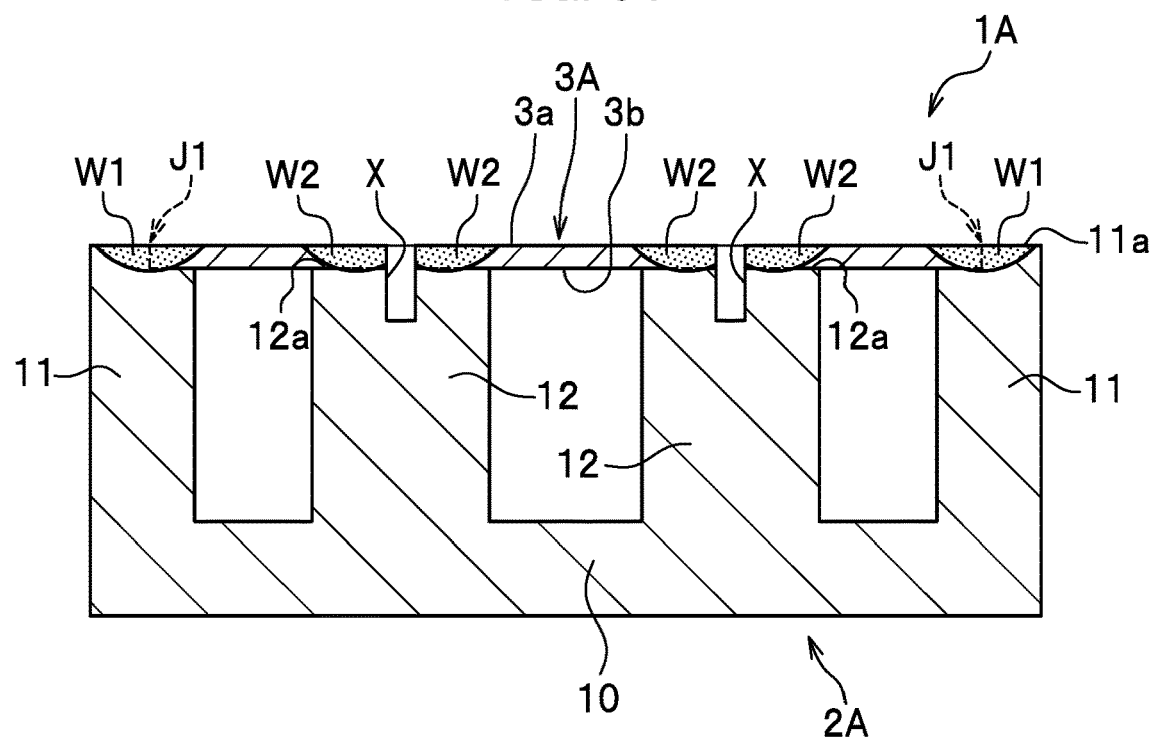
FIG. 34 is a cross-sectional view of the liquid cooling jacket in a hole-forming step of the method for manufacturing the same according to the second embodiment.

As illustrated in FIG. 34, the hole-forming step is a step of forming fixing holes X which communicate with the sealing body 3A and the columnar supports 12 and are used to fix a heating element H. The fixing holes X are each formed to penetrate a part of the plasticized region W2 so as to reach the columnar support 12.

The burr removing step is a step of removing burrs which are exposed on the front surfaces of the jacket body 2 and the sealing body 3A through the first primary joining step, the second primary joining step, and the hole-forming step. With the step, the front surfaces of the jacket body 2 and the sealing body 3A are clearly finished.

Figure 35:
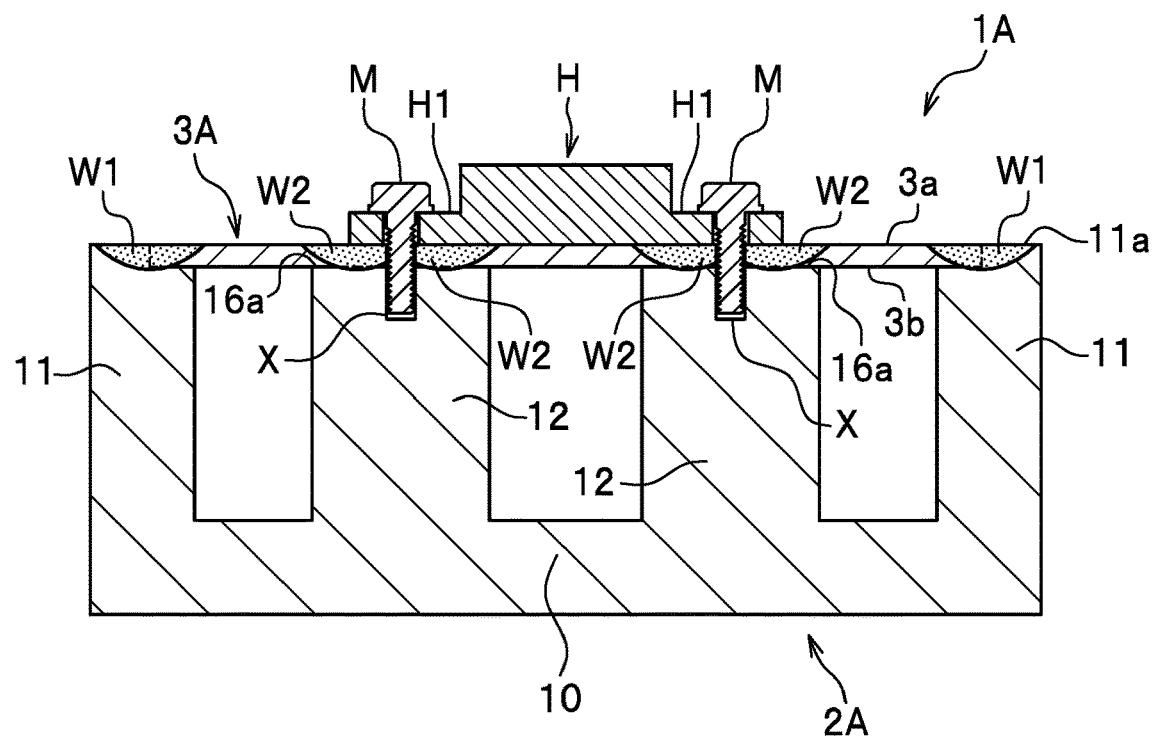
FIG. 35 is a cross-sectional view of the liquid cooling jacket in a mounting step of the method for manufacturing the same according to the second embodiment.

As illustrated in FIG. 35, the mounting step is a step of mounting the heating element H with fitting members M. When the heating element H is mounted, through holes formed in a flange H1 of the heating element H are communicated with the fixing holes X and the heating element H is fixed with the fitting members M such as screws. The fitting members M are each inserted to a position reaching the columnar support 12.

In the present embodiment, the fixing holes X are formed in the sealing body 3A side to have the heating element H fixed to the sealing body 3A, but the fixing holes X, which communicate with the bottom portion 10 and the columnar supports 12, may be formed in the bottom portion 10 to have the heating element H fixed to the bottom portion 10. The heating element H merely needs to be mounted to at least one of the sealing body 3A and the bottom portion 10. Further, in the present embodiment, the fixing holes X are formed, but the heating element H may be fixed with the fitting members M without the fixing holes X being formed.

The method for manufacturing a liquid cooling jacket as described above also achieves substantially the same effects as the first embodiment. In the first embodiment, the second abutted portions J2 (see FIG. 12) are exposed to the sealing body 3, but, in the second embodiment, the abutted portions are not exposed. However, as described in the second embodiment, the overlapped portions J3 are frictionally stirred from above the sealing body 3 so that the sealing body 3 is joined to the columnar supports 12. Further, in the second embodiment, since the sealing body 3A does not have hole portions and a columnar support stepped portion is not formed in the columnar support 12, the liquid cooling jacket is easily manufactured.

Further, according to the method for manufacturing a liquid cooling jacket of the present embodiment, the base end pin F2 and the distal end pin F3 are inserted in the sealing body 3. Therefore, a load on the friction stirring apparatus is reduced more than a case in which a shoulder portion of a rotary tool is pressed, and the primary joining rotary tool F is operated more stably. Still further, the load on the friction stirring apparatus is reduced so that the first abutted portion J1 located in a deep position is joined without a large load on the friction stirring apparatus.

Further, in the second primary joining step, friction stirring is performed to the inner side of the outer peripheral edge of the columnar support 12 therearound by one lap or more as in the present embodiment so that watertightness and airtightness are improved. The moving route of the primary joining rotary tool F in the second primary joining step is not necessarily one lap or more. The moving route may be set such that the plastically fluidized material does not flow inside the liquid cooling jacket 1A and at least a portion of the overlapped portion J3 may be subjected to friction stir joining.

The second embodiment of the present invention is described above, but design can be appropriately modified in a range without departing from the scope of the present invention. For example, in the second embodiment, the manufacturing method of either one of the first to third modifications described above may be employed to manufacture the liquid cooling jacket 1A.

The embodiments and the modifications of the present invention are described above, and the design can be appropriately modified. For example, fins may be arranged on at least one of the jacket body and the sealing body. Further, in the first primary joining step, the primary joining rotary tool F may be moved by two laps in the first abutted portion J1. Still further, different rotary tools may be used between the first primary joining step and the second primary joining step. Yet further, in each embodiment, the present invention is applied to a method for manufacturing a liquid cooling jacket with the heating element H, but can also be applied to a method for manufacturing a liquid cooling jacket without the heating element H. In this case, the hole-forming step and the mounting step are omitted.

Figure 36:
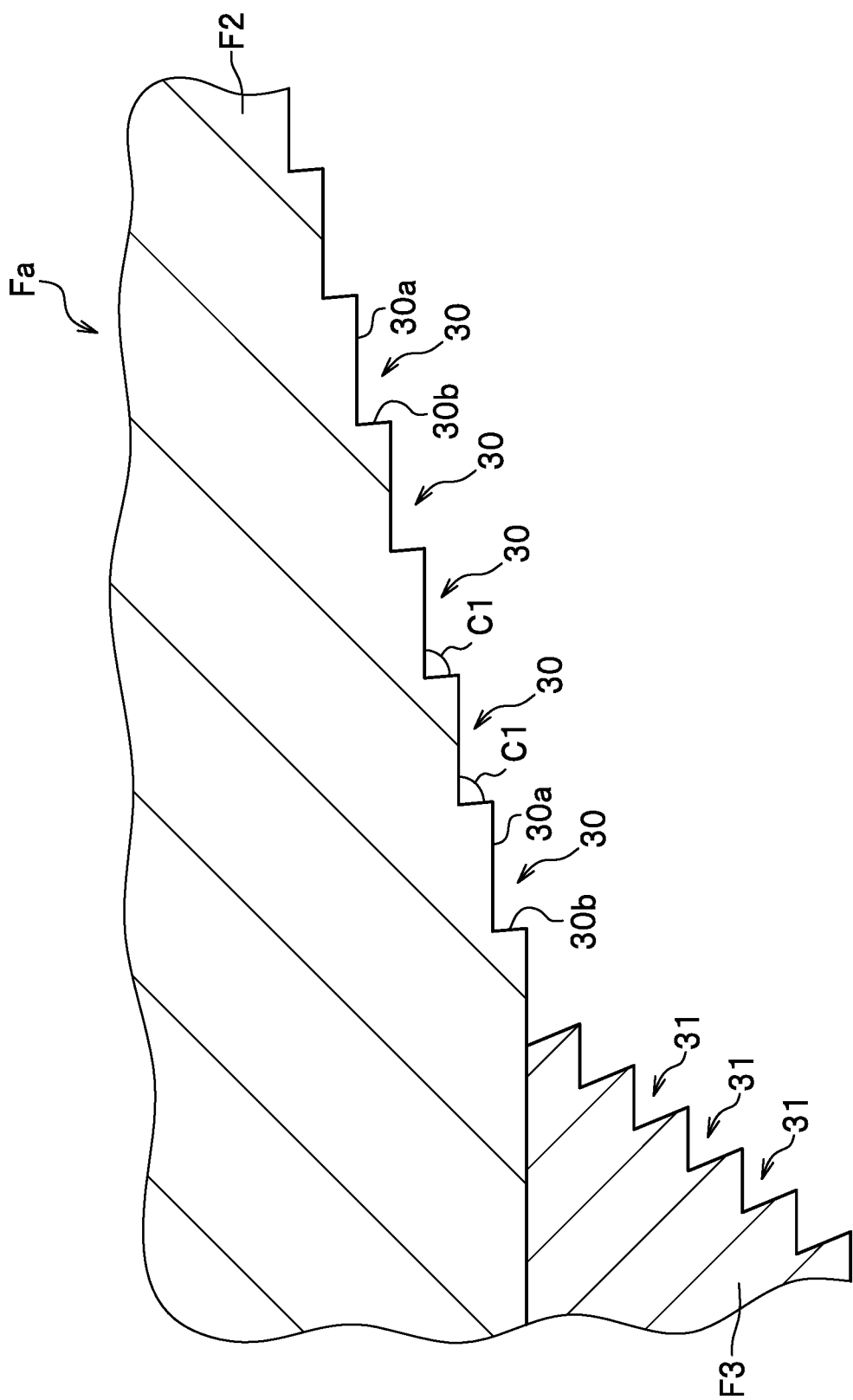
FIG. 36 is a cross-sectional view of a first modification of the primary joining rotary tool.

Design of the primary joining rotary tool F of the present invention can be appropriately modified. FIG. 36 is a side view of a first modification of the primary joining rotary tool of the present invention. As illustrated in FIG. 36, a primary joining rotary tool Fa according to the first modification has a stepped angle C1 of 85° defined by the stepped bottom surface 30a and stepped side surface 30b of the pin stepped portion 30. The stepped bottom surface 30a is parallel to the horizontal plane. Thus, the stepped bottom surface 30a is parallel to the horizontal plane, to have the stepped angle C1 set to an acute angle to such an extent that a plastically fluidized material flows outside without accumulating in and adhering to the pin stepped portion 30 during friction stirring.

Figure 37:
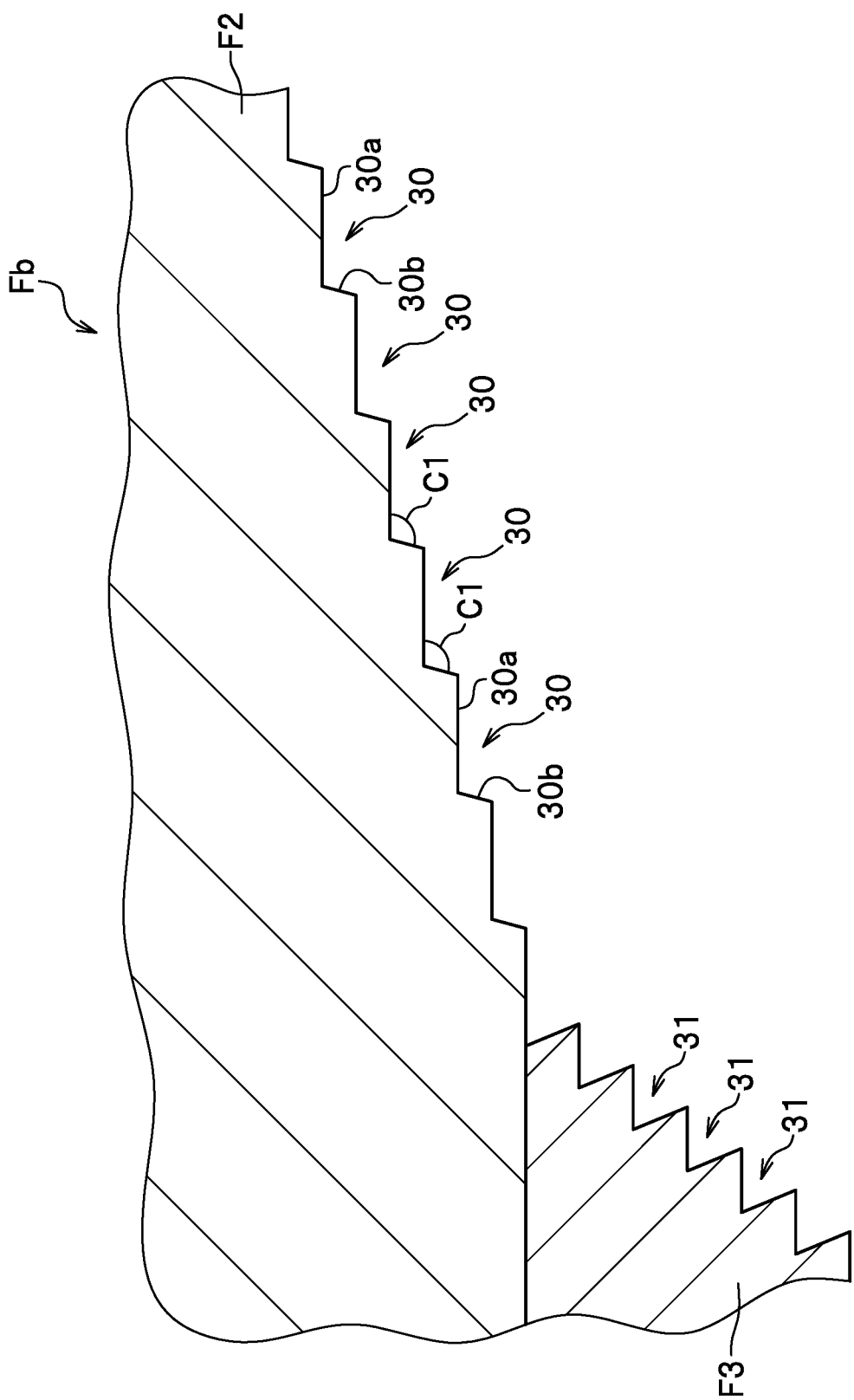
FIG. 37 is a cross-sectional view of a second modification of the primary joining rotary tool.

FIG. 37 is a side view of a second modification of the primary joining rotary tool of the present invention. As illustrated in FIG. 37, a primary joining rotary tool Fb according to the second modification has a stepped angle C1 of 115° at the pin stepped portion 30. The stepped bottom surface 30a is parallel to the horizontal plane. Thus, the stepped bottom surface 30a is parallel to the horizontal plane, to have the stepped angle C1 set to an obtuse angle to such an extent as to serve as the pin stepped portion 30.

Figure 38:
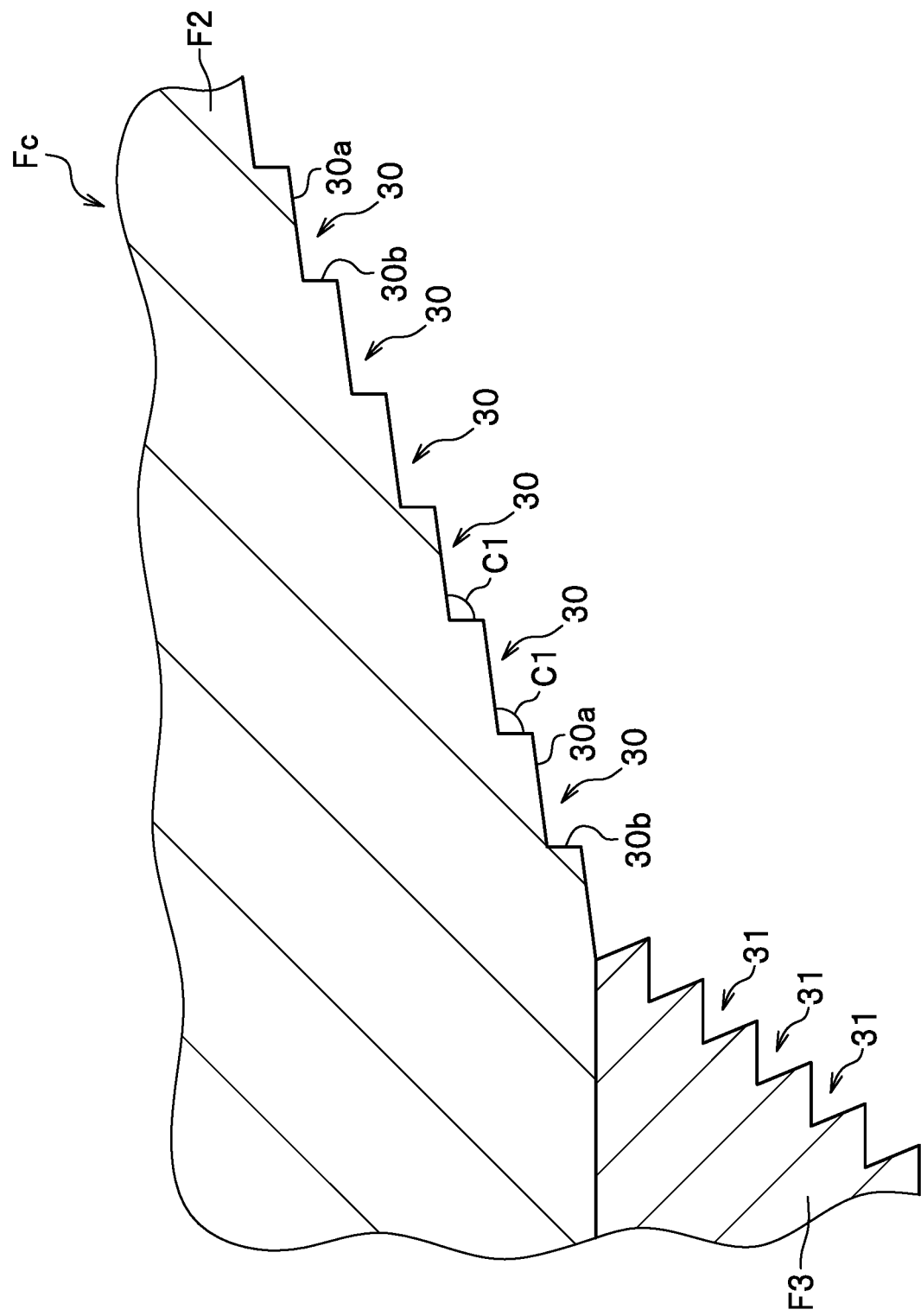
FIG. 38 is a cross-sectional view of a third modification of the primary joining rotary tool.

FIG. 38 is a side view of a third modification of the primary joining rotary tool of the present invention. As illustrated in FIG. 38, in a primary joining rotary tool Fc according to the third modification, the stepped bottom surface 30a is inclined upward at an angle of 10° with respect to the horizontal plane from the rotation axis of the tool toward the outer direction. The stepped side surface 30b is parallel to the vertical plane. Thus, the stepped bottom surface 30a may be formed to be inclined upward with respect to the horizontal surface from the rotation axis of the tool toward the outer direction to such an extent that a plastically fluidized material is pressed during friction stirring. The primary joining rotary tool described above in the first to third modifications achieves the same effects as the present embodiment.

REFERENCE NUMERALS 1 liquid cooling jacket
1A liquid cooling jacket
2 jacket body
2A jacket body
3 sealing body
3A sealing body
3a front surface
3b rear surface
3c outer peripheral side surface
10 bottom portion
11 peripheral wall portion
11A wall portion
11B wall portion
11C wall portion
11D wall portion
11a peripheral wall end surface
12 columnar support
12a columnar support end surface
13 recessed portion
14 peripheral wall stepped portion
14a stepped bottom surface
14b stepped side surface
16a columnar support end surface
17 columnar support stepped portion
17a stepped bottom surface
17b stepped side surface
F primary joining rotary tool (rotary tool)
Fa primary joining rotary tool
Fb primary joining rotary tool
Fc primary joining rotary tool
F1 base shaft portion
F2 base end pin
F3 distal end pin
30 pin stepped portion
30a stepped bottom surface
30b stepped side surface
31 spiral groove
A1 taper angle (of base end pin)
A2 taper angle
C1 stepped angle
C2 spiral angle
Z1 distance (of base end pin)
Z2 distance
Y1 height (of stepped side surface)
Y2 height
G provisional joining rotary tool
J1 first abutted portion
J2 second abutted portion
J3 overlapped portion
K table (cooling plate)
M fitting member
W1 plasticized region
W2 plasticized region
WP cooling pipe

The invention claimed is:

1. A method for manufacturing a liquid cooling jacket,
the liquid cooling jacket including a jacket body and a sealing body,
the jacket body including a bottom portion, a peripheral wall portion rising from a peripheral edge of the bottom portion, and a columnar support rising from the bottom portion,
the sealing body having a hole portion into which a distal end of the columnar support is inserted, and sealing an opening of the jacket body,
the jacket body being joined to the sealing body by friction stirring,
the method comprising steps of:
preparing for forming a peripheral wall stepped portion including a stepped bottom surface and a stepped side surface rising from the stepped bottom surface on an inner peripheral edge of the peripheral wall portion, forming a columnar support end surface of the columnar support so as to have the same height as a peripheral wall end surface of the peripheral wall portion, and forming a columnar support stepped portion including a stepped bottom surface and a stepped side surface rising from the stepped bottom surface on an outer periphery of a distal end of the columnar support;
placing the sealing body in the jacket body;
first primary joining of performing friction stirring to a first abutted portion, where the stepped side surface of the peripheral wall stepped portion is abutted with an outer peripheral side surface of the sealing body, with a rotary tool being moved around the first abutted portion by one lap; and
second primary joining of performing friction stirring to a second abutted portion, where the stepped side surface of the columnar support stepped portion is abutted with a hole wall of the hole portion, with a rotary tool being moved around the second abutted portion by one lap,
wherein the rotary tool is a primary joining rotary tool for friction stirring to include a base end pin and a distal end pin,
wherein a taper angle of the base end pin is larger than a taper angle of the distal end pin,
the base end pin includes a pin stepped portion in a stepped shape formed on an outer peripheral surface thereof, and
the distal end pin includes a flat surface perpendicular to a rotation axis of the rotary tool and includes a protrusion protruding from the flat surface, and
wherein, in the first primary joining and the second primary joining, the friction stirring is performed in a state where the jacket body and the sealing body are brought in contact with the flat surface of the distal end pin and the base end pin, and only the jacket body is brought in contact with a distal end surface of the protrusion.

2. A method for manufacturing a liquid cooling jacket,
the liquid cooling jacket including a jacket body and a sealing body,
the jacket body including a bottom portion, a peripheral wall portion rising from a peripheral edge of the bottom portion, and a columnar support rising from the bottom portion,
the sealing body sealing an opening of the jacket body,
the jacket body being joined to the sealing body by friction stirring, the method comprising steps of:
preparing for forming a peripheral wall stepped portion including a stepped bottom surface and a stepped side surface rising from the stepped bottom surface on an inner peripheral edge of the peripheral wall portion, and forming a columnar support end surface of the columnar support so as to have the same height as the stepped bottom surface of the peripheral wall stepped portion;
placing the sealing body in the jacket body;
first primary joining of performing friction stirring to a first abutted portion, where the stepped side surface of the peripheral wall stepped portion is abutted with an outer peripheral side surface of the sealing body, with a rotary tool being moved around the first abutted portion by one lap; and
second primary joining of performing friction stirring to an overlapped portion, where the columnar support end surface of the columnar support is overlapped with a rear surface of the sealing body, with a rotary tool being moved around the overlapped portion,
wherein the rotary tool is a primary joining rotary tool for friction stirring to include a base end pin and a distal end pin,
wherein a taper angle of the base end pin is larger than a taper angle of the distal end pin,
the base end pin includes a pin stepped portion in a stepped shape formed on an outer peripheral surface thereof, and
the distal end pin includes a flat surface perpendicular to a rotation axis of the rotary tool and includes a protrusion protruding from the flat surface, and
wherein, in the first primary joining, the friction stirring is performed in a state where the jacket body and the sealing body are brought in contact with the flat surface of the distal end pin and the base end pin, and only the jacket body is brought in contact with a distal end surface of the protrusion, and
in the second primary joining, the friction stirring is performed in a state where the sealing body is brought in contact with the flat surface of the distal end pin and the base end pin, and the jacket body is brought in contact with the distal end surface of the protrusion.

3. The method for manufacturing a liquid cooling jacket as claimed in claim 1, wherein, in the preparing, the jacket body is formed by die-casting to have the bottom portion formed to be convex toward a front surface of the jacket body, and the sealing body is formed to be convex toward a front surface thereof.

4. The method for manufacturing a liquid cooling jacket as claimed in claim 3, wherein an amount of deformation of the jacket body is measured in advance, and in the first primary joining and the second primary joining, the friction stirring is performed while an insertion depth of the rotary tool is adjusted in accordance with the amount of deformation.

5. The method for manufacturing a liquid cooling jacket as claimed in claim 1, further comprising provisional joining of provisionally joining at least either one of the first abutted portion and the second abutted portion prior to the first primary joining and the second primary joining.

6. The method for manufacturing a liquid cooling jacket as claimed in claim 2, further comprising provisional joining of provisionally joining the first abutted portion prior to the first primary joining.

7. The method for manufacturing a liquid cooling jacket as claimed in claim 1, wherein, in the first primary joining and the second primary joining, a cooling plate, in which a cooling medium flows, is arranged to face a rear surface of the bottom portion, and the friction stirring is performed while the jacket body and the sealing body are cooled by the cooling plate.

8. The method for manufacturing a liquid cooling jacket as claimed in claim 7, wherein a front surface of the cooling plate is brought in surface-contact with a rear surface of the bottom portion.

9. The method for manufacturing a liquid cooling jacket as claimed in claim 7,
wherein the cooling plate has a cooling flow path in which the cooling medium flows, and
wherein the cooling flow path has a planar shape to follow a moving trace of the rotary tool in the first primary joining.

10. The method for manufacturing a liquid cooling jacket as claimed in claim 7, wherein the cooling flow path, in which the cooling medium flows, is formed of a cooling pipe embedded in the cooling plate.

11. The method for manufacturing a liquid cooling jacket as claimed in claim 1, wherein, in the first primary joining and the second primary joining, a cooling medium flows in a hollow portion defined by the jacket body and the sealing body, and the friction stirring is performed while the jacket body and the sealing body are cooled.

* * * * *